US012333667B1

(12) United States Patent
Nigam et al.

(10) Patent No.: US 12,333,667 B1
(45) Date of Patent: Jun. 17, 2025

(54) CONTROL OF AVATARS IN AN AUGMENTED REALITY ENVIRONMENT

(71) Applicant: GENIES, INC., West Hollywood, CA (US)

(72) Inventors: Akash Raman Nigam, Venice, CA (US); Sally Slade, Los Angeles, CA (US)

(73) Assignee: GENIES, INC., West Hollywood, CA (US)

( * ) Notice: Subject to any disclaimer, the term of this patent is extended or adjusted under 35 U.S.C. 154(b) by 0 days.

(21) Appl. No.: 18/810,196

(22) Filed: Aug. 20, 2024

(51) Int. Cl.
*G06T 19/00* (2011.01)
*G06T 13/40* (2011.01)
*G06T 19/20* (2011.01)

(52) U.S. Cl.
CPC ............ *G06T 19/006* (2013.01); *G06T 13/40* (2013.01); *G06T 19/20* (2013.01); *G06T 2219/2004* (2013.01)

(58) Field of Classification Search
CPC ....... G06T 13/40; G06T 19/006; G06T 19/20; G06T 2219/2004
See application file for complete search history.

(56) References Cited

U.S. PATENT DOCUMENTS

| 2013/0093788 | A1* | 4/2013 | Liu | G01C 21/365 |
| | | | | 345/633 |
| 2024/0037879 | A1* | 2/2024 | Gardner | G06T 13/40 |
| 2024/0062472 | A1* | 2/2024 | Herling | G02B 27/017 |

OTHER PUBLICATIONS

Gao et al. "Object registration in semi-cluttered and partial-occluded scenes for augmented reality." Multimedia Tools and Applications 78 (2019): 15079-15099. (Year: 2018).*

* cited by examiner

*Primary Examiner* — Daniel F Hajnik
*Assistant Examiner* — Jed-Justin Imperial
(74) *Attorney, Agent, or Firm* — Dority & Manning, P.A.

(57) ABSTRACT

Provided are methods, systems, devices, apparatuses, and tangible non-transitory computer readable media for controlling avatars in an augmented reality environment. The disclosed technology can receive sensor data comprising images of a physical environment and images of a user. Based on the sensor data, an augmented reality environment comprising an avatar and based on the images of the physical environment can be generated. The avatar can comprise a three-dimensional model comprising a facial region based on the images of the user. Inputs to control the avatar within the augmented reality environment can be detected and facial states of the user can be determined based on the images. Based on the inputs and the facial states, states of the avatar can be modified. The states of the avatar can comprise a position of the avatar within the augmented reality environment and a configuration of the facial region based on the facial states.

20 Claims, 10 Drawing Sheets

CONTROL OF AVATARS IN AN AUGMENTED REALITY ENVIRONMENT

FIELD

The present disclosure generally relates to controlling avatars that can be used in augmented reality environments. More particularly, the present disclosure relates to controlling avatars within an augmented reality environment based on the detection and processing of inputs and a physical environment.

BACKGROUND

An augmented reality environment can be implemented on a variety of computing devices. Further, the augmented reality environment can be based on states of a physical environment such that objects in the physical environment can be represented as virtual objects within the augmented reality environment. Operations can be performed to change the state of the virtual objects or cause the virtual objects to interact with other virtual objects. The virtual objects can be configured to change in response to changes in the state of the physical environment. Accordingly, different approaches can be used to present virtual objects in an augmented reality environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of controlling avatars. The computer-implemented method can comprise receiving, by a computing system comprising one or more processors, sensor data comprising a plurality of images of a physical environment and one or more images of a user. The computer-implemented method can comprise generating, by the computing system, based on the sensor data, an augmented reality environment comprising an avatar. The augmented reality environment can be based on the plurality of images of the physical environment. Further, the avatar can comprise a three-dimensional model comprising a facial region based on the one or more images of the user. The computer-implemented method can comprise detecting, by the computing system, one or more inputs to control the avatar within the augmented reality environment. The computer-implemented method can comprise determining, by the computing system, based on the one or more images of the user, one or more facial states of the user. The computer-implemented method can comprise modifying, by the computing system, based on the one or more inputs and the one or more facial states, one or more states of the avatar. The one or more states of the avatar can comprise a position of the avatar within the augmented reality environment and a configuration of the facial region based on the one or more facial states.

Another example aspect of the present disclosure is directed to one or more tangible non-transitory computer-readable media storing computer-readable instructions that when executed by one or more processors cause the one or more processors to perform operations. The operations can comprise receiving sensor data comprising a plurality of images of a physical environment and one or more images of a user. The operations can comprise generating, based on the sensor data, an augmented reality environment comprising an avatar. The augmented reality environment can be based on the plurality of images of the physical environment. Further, the avatar can comprise a three-dimensional model comprising a facial region based on the one or more images of the user. The operations can comprise detecting one or more inputs to control the avatar within the augmented reality environment. The operations can comprise determining, based on the one or more images of the user, one or more facial states of the user. The operations can comprise modifying, based on the one or more inputs and the one or more facial states, one or more states of the avatar. The one or more states of the avatar can comprise a position of the avatar within the augmented reality environment and a configuration of the facial region based on the one or more facial states.

Another example aspect of the present disclosure is directed to a computing system including: one or more processors; and one or more non-transitory computer-readable media storing instructions that when executed by the one or more processors cause the one or more processors to perform operations. The operations can comprise receiving sensor data comprising a plurality of images of a physical environment and one or more images of a user. The operations can comprise generating, based on the sensor data, an augmented reality environment comprising an avatar. The augmented reality environment can be based on the plurality of images of the physical environment. Further, the avatar can comprise a three-dimensional model comprising a facial region based on the one or more images of the user. The operations can comprise detecting one or more inputs to control the avatar within the augmented reality environment. The operations can comprise determining, based on the one or more images of the user, one or more facial states of the user. The operations can comprise modifying, based on the one or more inputs and the one or more facial states, one or more states of the avatar. The one or more states of the avatar can comprise a position of the avatar within the augmented reality environment and a configuration of the facial region based on the one or more facial states.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
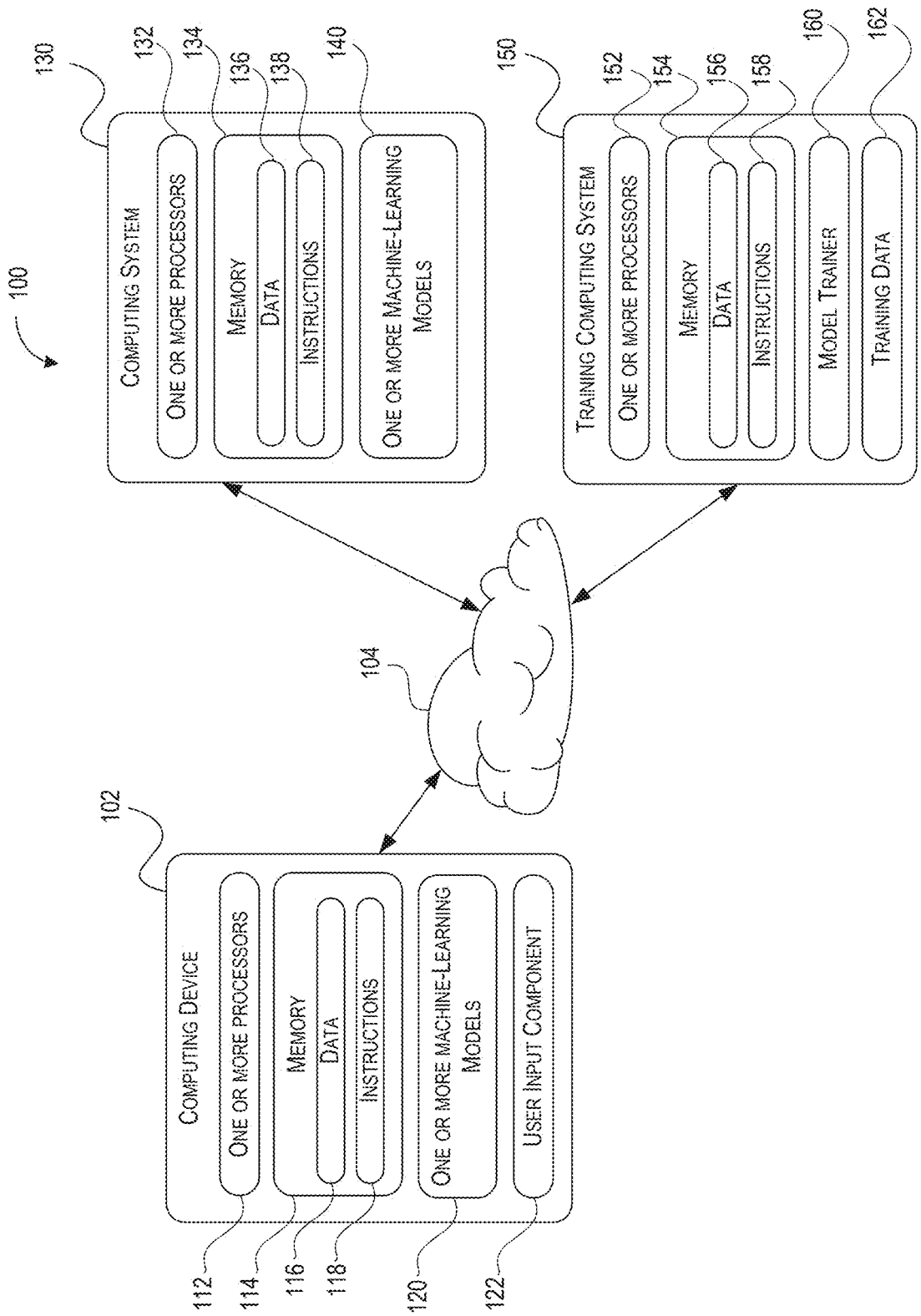
FIG. 1 depicts a diagram of an example system according to example embodiments of the present disclosure.

Reference numerals that are repeated across plural figures are intended to identify the same features in various implementations.

DETAILED DESCRIPTION

Generally, the present disclosure is directed to controlling avatars that can be used in an augmented reality environment. In particular, the disclosed technology is directed to a computing system that can be used to control avatars in an augmented reality environment based on the detection of inputs (e.g., user inputs to control an avatar). Further, the disclosed technology can automatically modify the state of the avatar within the augmented reality environment based on the state of the physical environment surrounding the user.

For example, a user can use an application that is executed by a computing system of the disclosed technology to control an avatar in an augmented reality environment. The avatar can comprise a representation (e.g., appearance based on the appearance of a user) that can be controlled based on the one or more inputs. For example, the avatar can be moved (e.g., receive input to make the avatar appear to walk and/or run) and perform various actions (e.g., jumping, smiling, and/or gesturing) within the augmented reality environment. The computing system can receive sensor data that can comprise a plurality of images of a physical environment and one or more images of a user. For example, the system can receive images of a physical environment (e.g., an office space) via a rear-facing camera of a smartphone. Further, the system can receive images of a user's face via a front-facing smartphone camera. The computing system can then use the sensor data to generate an augmented reality environment that includes an avatar. The augmented reality environment can be based on the plurality of images of the physical environment. For example, if the plurality of images include images of a classroom a user is present in, the augmented reality environment can be based on the images of the classroom.

The avatar can have an appearance based on the appearance of the user. For example, the avatar of a tall teenage boy can appear to be a tall teenage boy within the augmented reality environment. Further, the avatar can comprise a three-dimensional model that includes a facial region based on the one or more images of the user. For example, the avatar of a tall male user with large eyes, curly black hair, and wearing sunglasses can be represented in the augmented reality environment as a tall male avatar with large eyes, curly black hair, and wearing sunglasses.

Further, the computing system can be configured to detect one or more inputs that the user uses to control the avatar in the augmented reality environment. For example, the computing system can be configured to detect touch inputs on a touchscreen device (e.g., a smartphone) that a user uses to control movement of the avatar in the augmented reality environment. Additionally, the augmented reality environment can be configured to display virtual objects (e.g., three-dimensional models of objects) that the avatar can interact with via the one or more inputs. For example, inputs can be used to move an avatar from one location in the augmented reality environment to another location in the augmented reality environment. Additionally, user inputs can include inputs to communicate with other avatars that are represented in the augmented reality environment. For example, a user can use voice chat or text chat to communicate with other avatars in the augmented reality environment.

Based on the one or more images of the user, one or more facial states of the user can be determined. For example, the computing system can determine facial states including facial expressions of a user (e.g., smiling or frowning) and/or a gaze direction of a user.

The computing system can then modify one or more states of the avatar based on the one or more inputs and the one or more facial states. Further, the one or more states of the avatar can comprise a position of the avatar within the augmented reality environment and a configuration of the facial region based on the one or more facial states. For example, if inputs to move the avatar forward and jump are detected, the avatar can move (e.g., walk) forward and jump within the augmented reality environment. Further, if a user smiles, the configuration of the facial region of the avatar can be modified to reflect the user's smile (e.g., the avatar can smile).

The disclosed technology can be used in a variety of augmented reality applications including entertainment and communication applications. As such, the disclosed technology can improve the user experience by improving the effectiveness with which avatars in an augmented reality environment can be controlled. The ability to control avatars more effectively in an augmented reality environment can improve the learning curve associated with using an avatar. Further, more expressive, and finely controlled avatars can improve communication within an augmented reality environment. Further, the disclosed technology can assist a user in more effectively performing the technical task of controlling avatars in an augmented reality environment by means of a continued and/or guided human-machine interaction process in which the disclosed technology automatically detects a physical environment and inputs of a user and modifies states of an avatar in real-time based on the detected inputs.

In some embodiments, the disclosed technology can comprise a computing system (e.g., an augmented reality computing system) that can comprise one or more computing devices (e.g., devices with one or more computer processors and a memory that can store one or more instructions) that can send, receive, process, generate, and/or modify data (e.g., data associated with one or more states of an avatar and/or an augmented reality environment). The data and/or one or more signals can be communicated (e.g., sent and/or received) by the computing system with various other systems and/or devices (e.g., one or more remote computing systems, one or more remote computing devices, and/or one or more software applications operating on one or more computing devices) that can send and/or receive data that indicates the state of an avatar and/or an augmented reality environment. In some embodiments, the computing system (e.g., the augmented reality environment computing system) can comprise one or more features of the computing device 102 that is described with respect to FIG. 1 and/or the computing device 200 that is described with respect to FIG. 2. Further, the augmented reality computing system can be associated with one or more machine-learning models that include one or more features of the one or more machine-learning models 120 that are described with respect to FIG. 1

Furthermore, the computing system can comprise specialized hardware (e.g., an application specific integrated circuit) and/or software that enables the computing system to perform one or more operations specific to the disclosed technology including receiving sensor data, generating an augmented reality environment based on the sensor data and comprising an avatar, detecting inputs to control the avatar within the augmented reality environment, determining facial states of a user, and/or modifying one or more states of the avatar.

The computing system can receive sensor data. The sensor data can be based on sensor output from one or more sensors comprising one or more cameras that are configured to capture the plurality of images of the physical environment and/or the one or more images of the user. In some embodiments, the sensor data can be based on sensor output from one or more devices that are configured to detect the location and/or position of surfaces in the physical environment. For example, the sensor data can be based on sensor output from one or more light detection and ranging (LiDAR) devices, one or more dot projectors, one or more sonar devices, and/or one or more radar devices. Further, the sensor data can be based on one or more depth sensors (e.g., one or more dot projectors) that are configured to generate a three-dimensional map of an object (e.g., one or more portions of a user comprising a user's face, a user's hand, and/or a user's body). The sensor data can be based on sensor output from one or more motion sensors that are configured to detect one or more motions and/or a position (e.g., orientation) of the computing device and can include one or more accelerometers and/or one or more gyroscopes. For example, the one or more motion sensors can detect an orientation of the computing system, an acceleration of the computing system, and/or a direction in which the computing system is moving. The sensor data can be used to determine the location and/or position of one or more objects in the physical environment. For example, the sensor data can be used to determine the location and/or position of the user, the ground, floors, ceilings, walls, people, pets, vehicles, and/or furniture.

The sensor data can comprise a plurality of images of a physical environment and/or one or more images of a user. The plurality of images of the physical environment can be captured by one or more cameras that are configured to detect the physical environment. The plurality of images of the physical environment can comprise images based on one or more cameras configured to detect the visible light spectrum and/or the infrared light spectrum. For example, the plurality of images of the physical environment can comprise images of a classroom in which a user is physically present. Further, the plurality of images of the physical environment can be captured from one or more perspectives and/or one or more angles. For example, the plurality of images can be captured from the perspective of a user holding a smartphone (e.g., a smartphone comprising a front camera and/or rear camera) at the height of the user's chest and aiming the camera in a forward direction. Further, the plurality of images can comprise still images and/or video.

In some embodiments, the plurality of images of the physical environment can comprise one or more images of the user. For example, the plurality of images of the physical environment can comprise one or more images in which the user is visible within the physical environment. In some embodiments, the user can be in the foreground of the physical environment. For example, the plurality of images of the physical environment can comprise an image in which the user is closest to the camera. In some embodiments, the user can be in the background of the physical environment. For example, the plurality of images of the physical environment can comprise an image in which the user is behind other objects that are visible in the image. Further, the user can be included in the plurality of images of the physical environment and/or the physical environment can be included the one or more images of the user.

In some embodiments, the avatar can be substantially adjacent to the user within the augmented reality environment (e.g., less than one virtual meter away from the user in an augmented reality environment in which distances correspond to real-world distances in the physical environment the augmented reality environment is based on). For example, the augmented reality environment can be based on images of the physical environment that comprise the user and are captured by a front-facing camera of the computing device (e.g., the front-facing camera of a smartphone). The user can be detected and the location of the avatar within the augmented reality can be determined based on the location of the user within the augmented reality environment.

In some embodiments, the one or more images of the user can be based on detection of the user by a front-facing camera of the computing system. For example, the computing system can comprise a smartphone that comprises a front-facing camera that is configured to capture the one or more images of the user that is operating the smartphone.

In some embodiments, the plurality of images of the physical environment can be based on detection of the physical environment by a rear-facing camera of the computing system. For example, the computing system can comprise a smartphone that comprises a rear-facing camera that is configured to capture the plurality of images of a portion of the environment that a user points the rear-facing camera at.

The computing system can generate an augmented reality environment. Generating the augmented reality environment can be based on the sensor data. For example, the augmented reality environment can be based on the plurality of images of the physical environment (e.g., an office space or restaurant in which a user is present). In some embodiments, the augmented reality environment can be based on one or more states of the physical environment (e.g., real-world states). For example, the computing system can comprise sensors (e.g., one or more cameras, one or more LiDAR devices, and/or one or more microphones) that can detect one or more states of the physical environment around the computing system.

The computing system can use the one or more states of the physical environment that were detected to generate one or more portions of the augmented reality environment. The augmented reality environment can be displayed on a display device (e.g., a smartphone screen) and can comprise a combination of representations that are based on one or more states of the physical environment (e.g., a user, walls, a floor, the ground, a ceiling, and/or furniture) that are detected by the computing system and/or one or more virtual states (e.g., the avatar and/or one or more virtual objects) that are generated by the computing system.

In some embodiments, the computing system can determine one or more portions of the physical environment that comprise objects comprising solid surfaces (e.g., walls, a floor, the ground, and/or a ceiling). For example, the computing system can perform one or more object detection and/or recognition operations to detect surfaces which can comprise one or more objects (e.g., one or more vehicles, furniture, and/or people), one or more walls, a floor (e.g., the floor of an indoor environment), the ground (e.g., the ground of an outdoor environment), and/or a ceiling in the physical environment. The computing system can then determine that the avatar will not be generated in portions of the augmented reality environment that correspond to the portions of the physical environment that comprise the detected surfaces.

In some embodiments, the computing system can configure the avatar to be generated in some portions of the detected surfaces and not in other portions. For example, the avatar can be configured not to be generated in a floor or ceiling of a physical environment (e.g., the avatar can appear to be standing on the floor of the augmented reality environment) but can be configured to be generated in other surfaces such as walls (e.g., an avatar can appear to pass through walls of the augmented reality environment).

The augmented reality environment can comprise an avatar. For example, the avatar can comprise a human shaped figure (e.g., a figure comprising a head attached to a neck that is attached to a torso, two arms (with one hand per arm) attached to opposite sides of the torso, and two legs (with one foot per leg) attached to the bottom of the torso). The avatar can be based on the appearance of the user. For example, the sensor data can comprise images of the user that can be detected and/or recognized by the computing system and used to generate an avatar that can have an appearance that is similar to the appearance of the user.

The avatar can comprise a model (e.g., a two-dimensional model or a three-dimensional model) that can comprise a facial region that can be based on the one or more images of the user. Further, the avatar can comprise a facial region that is based on the detection and/or recognition of facial features of a user. For example, the one or more images of the user can be used to determine a model (e.g., a two-dimensional model or three-dimensional model) of the avatar's facial region. In some embodiments, the facial region of the avatar can be based on sensor data comprising a three-dimensional map of a user's face (e.g., a three-dimensional map of a user's face based on detection of the user's face by one or more dot projectors and/or a LiDAR point cloud based on detection of a user's face using one or more LiDAR devices). The shape of the user's face can be used to determine the appearance of the facial region of the avatar.

In some embodiments, the model of the avatar can comprise a mesh model (e.g., a two-dimensional mesh or three-dimensional mesh) of the avatar. For example, the shape of an avatar can be based on sensor data comprising a three-dimensional mesh (e.g., a polygonal mesh that can comprise vertices, edges, and faces) of the user. The mesh model of the avatar can be configured to be controlled based on the one or more inputs and can be represented as an animated figure in the augmented reality environment.

The computing system can detect one or more inputs to control an avatar within the augmented reality environment. Detection of the one or more inputs can be based on data sent from one or more input devices (e.g., a touchscreen, keyboard, mouse, stylus, extended reality device, microphone, physical joystick, virtual joystick, and/or gamepad) that are configured to detect inputs from a user. In some embodiments, the one or more input devices can comprise an extended reality device (e.g., an extended reality headset) that can comprise output devices (e.g., a plurality of display devices and audio speakers) and/or sensors (e.g., one or more cameras, one or more LiDAR devices, one or more motion sensors, and/or one or more microphones) that are configured to detect the location, position, and/or movements of a user.

The computing system can determine, based on the one or more images of the user, one or more facial states of the user. For example, the computing system can implement a machine-learning model that is configured to determine facial states of the user (e.g., facial expressions, gaze direction, and/or head inclination) based on the one or more images of the user. For example, the computing system can determine the direction in which a user is looking, the direction a user's head is aligned with, whether a user is smiling, winking, nodding, and/or speaking.

The computing system can modify one or more states of the avatar based on the one or more inputs and/or the one or more facial states. The one or more states of the avatar can comprise a position of the avatar within the augmented reality environment and/or a configuration of the facial region based on the one or more facial states. Modifying the position of the avatar within the augmented reality environment can comprise changing the location of the avatar within the augmented reality environment and/or changing a configuration of the avatar. Changing the configuration of the avatar can comprise changing a configuration of the avatar (e.g., an arrangement of one or more portions of the avatar). For example, a model (e.g., a two-dimensional model or three-dimensional model) of the avatar can be configured to change configuration within the augmented reality environment based on the one or more inputs to control the avatar.

Further, modifying the one or more states of the avatar can comprise modifying the shape, color, and/or size of the avatar. For example, the one or more modifications can comprise modifying a shape, color, and/or size of the three-dimensional model associated with the avatar. Further, the one or more modifications can comprise modifying the movement speed of the avatar (e.g., increasing or decreasing the movement speed of the avatar). The one or more inputs may control avatar movements that control the avatar jumping, crouching, ducking, sliding, walking, and/or running. Further, the one or more inputs can be used to cause the avatar to gesture (e.g., wave and/or form a peace sign with the avatar's fingers).

In some embodiments, virtual distances within the augmented reality environment correspond to physical distances within the physical environment. Further, a unit of distance in the physical environment can be represented as corresponding virtual unit of distance within the augmented reality environment. For example, one meter in the physical environment can correspond to one virtual meter in the augmented reality environment. Further, the relative dimensions and/or spatial relationships of physical objects in the augmented reality environment can correspond to the relative dimensions and/or spatial relationships of virtual objects in the augmented reality environment. For example, a user that is twice the height of a physical desk in the physical environment can be represented in the augmented reality environment as an avatar that is twice the height of a virtual representation of the physical desk in the augmented reality environment. By way of further example, a first cube that has twice the volume of a second cube in the physical environment can be represented in the augmented reality environment as a first virtual cube that has twice the volume of a second virtual cube.

The location of one or more virtual objects in the augmented reality environment can correspond to the location of one or more physical objects in the physical environment. Further, the augmented reality environment can comprise a virtual computing system that can be located at a virtual location within the augmented reality environment that corresponds to the physical location of the computing system within the physical environment. For example, if a physical location of the computing system is three meters in front of a physical table in the physical environment, the virtual location of the virtual computing system can be three virtual meters in front of a virtual table in the augmented reality environment that is based on the physical table in the physical environment.

The computing system can determine the virtual location of the avatar within the augmented reality environment. For example, the computing system can determine the virtual location of the avatar within the augmented reality environment relative to the virtual location of the virtual computing system within the augmented reality environment.

Further, the computing system can determine, based on the sensor data, that the virtual location of the avatar is at least a predetermined virtual distance from the virtual computing system. For example, the computing system can detect the physical environment and generate sensor data (e.g., LiDAR data from a LiDAR device and/or image data from a camera). In some embodiments, the computing system can use one or more GPS signals to determine the location (e.g., latitude, longitude, and/or altitude) of the computing system within the physical environment. The computing system can use the sensor data to determine the location of the computing system within the physical environment. Based on the location of the computing system within the physical environment, the computing system can determine the corresponding virtual location of the virtual computing system within the augmented reality environment. Based on the virtual location of the virtual computing system and the virtual location of the avatar, the computing system can determine that the avatar is at least the predetermined virtual distance from the virtual computing system. Based on the physical location of the computing system changing, the virtual location of the avatar within the augmented reality environment can also change.

For example, if the predetermined virtual distance is three meters and the computing system corresponding to the virtual computing system is moved towards the avatar, the avatar can move backwards to maintain the three-meter predetermined virtual distance within the augmented reality environment. Further, if the computing system corresponding to the virtual computing system is moved away from the avatar, the avatar can move forwards and maintain the three-meter predetermined virtual distance within the augmented reality environment.

In some embodiments, the computing system can modify the predetermined virtual distance based on one or more inputs to modify the predetermined virtual distance. For example, a user can increase the predetermined virtual distance so that the avatar appears further away from the user (e.g., smaller in the augmented reality environment). Further, a user can decrease the predetermined virtual distance so that the avatar appears closer to the user (e.g., larger in the augmented reality environment). Modifying the predetermined virtual distance can comprise receiving one or more inputs (e.g., one or more tactile inputs to a display device of the computing system such as a smartphone display). Further, the predetermined virtual distance can be based on selecting (e.g., touching) a portion of the display device that corresponds to the portion of the augmented reality environment. For example, the augmented reality environment can be displayed on a display device of a smartphone. A user can touch a portion of the smartphone that indicates the predetermined virtual distance at which to position the avatar relative to the smartphone.

In some embodiments, the computing system can determine a physical location that is a predetermined physical distance from the computing system. For example, the computing system can use sensor data from one or more LiDAR devices to determine a physical location that is a predetermined physical distance (e.g., three meters) in front of the computing system. Further, the computing system can determine a virtual location within the augmented reality environment that corresponds to the predetermined physical distance (e.g., a physical location that is three meters in front of the computing system). The computing system can determine that the avatar is generated at a virtual location within the augmented reality environment that corresponds to the physical location that is at least the predetermined physical distance from the computing system.

In some embodiments, the avatar can comprise a plurality of segments. For example, the avatar can comprise a plurality of segments corresponding to the limbs and/or joints of a person. The plurality of segments can be connected and configured to move based on the one or more inputs. For example, one or more inputs to move the avatar forward can cause leg segments of an avatar to stride forward as the arm segments swing at the side of the avatar.

The avatar can be configured to perform a plurality of movements to move to at least the predetermined virtual distance from the virtual computing system based on the virtual computing system being within a predetermined virtual distance from the virtual location of the avatar. For example, if the computing system moves forwards within the physical environment, the virtual computing system can be moved forward by a corresponding distance within the augmented reality environment.

In some embodiments, the plurality of movements can comprise the plurality of segments changing position in a manner corresponding to bipedal locomotion. For example, one or more inputs to move the avatar forward can cause the leg segments of the avatar to change position in a manner that corresponds to bipedal locomotion (e.g., walking forwards). Further, arm segments of the avatar can change position in a manner that corresponds to arms swinging.

In some embodiments, the facial region of the avatar can comprise two eye regions that can be configured to be in a plurality of positions. The model of the avatar (e.g., a two-dimensional model or three-dimensional model) can comprise eye regions comprising eye segments that are spherical or substantially spherical in appearance and which comprise a first eye portion which can include a smaller dark colored portion (e.g., dark brown colored portion) surrounded by a second eye portion which can include a larger light-colored portion (e.g., a white colored portion). Changing the position of the dark colored portion of the eye regions can generate the appearance of an avatar looking in a particular direction.

In some embodiments, based on detecting the one or more inputs (e.g., one or more tactile inputs and/or one or more motion inputs), the plurality of positions of the eye regions (e.g., two eye regions corresponding to the appearance of two eyes of an avatar) can be directed towards the virtual computing system. For example, the augmented reality environment can be generated on a smartphone that comprises a touch screen. A user can touch a portion of the touch screen and the eye regions of the avatar can be positioned to appear as if the avatar is looking at the portion of the touch screen in which the user's touch was detected.

In some embodiments, the position of the eye regions of the avatar can be configured to automatically appear to be directed at (e.g., appear to be looking at) a location within the augmented reality environment. The location within the augmented reality environment that the eye regions of the avatar appear to be directed at can be based on a selection by the user. The selection of the location within the augmented reality environment can be based on one or more inputs (e.g., one or more tactile inputs to a display device that displays the augmented reality environment) from a user of a computing system (e.g., a smartphone). The positions of the eye regions of the avatar can be configured to be directed at the location selected by the user. For example, the second eye portions of the eye regions of the avatar can be oriented in the direction of the location selected by the user. Further, a front side of the avatar can be modified to be directed at the location selected by the user. For example, the front side of an avatar can comprise a side on which a face and/or chest of the avatar are located. The chest and/or face of the avatar can be modified such that the face and/or chest are directed at the location selected by the user.

The computing system can generate one or more additional avatars in the augmented reality environment. Further, the one or more additional avatars can be different from the avatar. For example, based on one or more inputs (e.g., inputs to generate an additional avatar), the computing system can generate an additional avatar that has the same appearance as the first avatar that was generated. Further, the additional avatar can have an appearance that is different from the appearance of the first avatar that was generated (e.g., a different two-dimensional model, three-dimensional model, different facial region, different features, different size, different color, and/or different shape). For example, the avatar can appear to be a tall woman with large eyes, long dark colored hair, wearing blue trousers and a shirt and the additional avatar can appear to be a shorter woman with smaller eyes, short light-colored hair, wearing a red dress.

The computing system can determine that the one or more additional avatars occupy a different portion of the augmented reality environment from the portion of the augmented reality environment occupied by the avatar (e.g., the first avatar that was generated). For example, the computing system can determine that the avatar and the one or more additional avatars are not generated in the same portion of the augmented reality environment.

In some embodiments, the one or more additional avatars can be controlled by one or more secondary users that are not in the physical environment. For example, an additional avatar can be controlled by a secondary user located in a different geographic location (e.g., a different room in a building or a different city) from the user that controls the avatar. Further, in some embodiments, the user can control the one or more additional avatars. For example, a user can control the avatar and one or more additional avatars simultaneously or control the avatar and/or one or more additional avatars one at a time.

In some embodiments, the avatar and the one or more additional avatars can be configured to interact with one or more virtual objects within the augmented reality environment. For example, the augmented reality environment can comprise one or more virtual chairs that the avatar can sit in or a ball that the avatar can pick up or throw. Further, the additional avatar can be configured to move within the augmented reality environment based on the movements of the avatar controlled by the user. For example, an additional avatar can be configured to automatically follow the avatar or maintain a certain distance from the avatar within the augmented reality environment.

Further, the one or more additional avatars can be configured to automatically mimic the movements of the avatar. For example, the one or more additional avatars can be configured to mimic the facial region of the avatar, mimic the position of the avatar (e.g., if the avatar is standing the one or more additional avatars can be standing), and/or mimic the movement speed of the avatar. In some embodiments, the one or more additional avatars can be configured to perform movements in response to movements of the avatar. For example, the one or more additional avatars can move backwards when the avatar moves forward, or a head region of the one or more additional avatars can turn to follow the movement of the avatar. Further, eye regions of the one or more additional avatars can be configured to follow the movement of the avatar within the augmented reality environment. The one or more additional avatars can be configured to have any of the capabilities and/or features of the avatar. Further, the one or more additional avatars can be configured to perform any of the actions performed by the avatar.

In some embodiments, the computing system can determine one or more changes in a position of the user. The determination of the one or more changes in the position of the user can be based on the one or more images of the user. For example, the computing system can process one or more images of the user and determine that the user has stood up from a sitting position or is walking in a particular direction.

The computing system can modify the position of the avatar based on the one or more changes in the position of the user. For example, if an avatar and a user are standing and the user sits down, the position of the avatar can be modified to a sitting position. Further, if a user is walking forwards, the position of the avatar can be modified so that the avatar appears to walk forwards.

The systems, methods, devices, apparatuses, and tangible non-transitory computer-readable media in the disclosed technology can provide a variety of technical effects and benefits including improving the generation of avatars for use in augmented reality environments. In particular, the disclosed technology may assist a user (e.g., a user of an application that controls an avatar in an augmented reality environment) in performing a technical task (e.g., controlling an avatar in an augmented reality environment) by means of a continued and/or guided human-machine interaction process. It may also provide benefits including facilitating communication in an augmented reality environment and/or improving the efficiency of controlling avatars in an augmented reality environment.

Accordingly, the disclosed technology may improve the effectiveness with which avatars are controlled in an augmented reality environment which can allow a computing device to more effectively perform the technical task of detecting inputs and controlling virtual objects (e.g., an avatar) in an augmented reality environment by means of a continued and/or guided human-machine interaction process. The disclosed technology provides the specific benefits of improved control of avatars in augmented reality environments, which can be used to improve the effectiveness of a wide variety of services including online gaming services, online collaborative interaction services, and/or online meeting services.

With reference now to FIGS. 1-10, example embodiments of the present disclosure will be discussed in further detail. FIG. 1 depicts a diagram of an example system according to example embodiments of the present disclosure. The system 100 can comprise a computing device 102, a server computing system 130, and a training computing system 150 that are communicatively connected and/or coupled over a network 104.

The computing device 102 can comprise any type of computing device, including, for example, a mobile computing device (e.g., smartphone or tablet), an extended reality computing device (e.g., a computing device that can be used to implement virtual reality, augmented reality, and/or mixed reality), a personal computing device (e.g., a laptop computing device or a desktop computing device), a gaming console, a controller, a wearable computing device (e.g., a smart watch), an embedded computing device, and/or any other type of computing device.

The computing device 102 can comprise one or more processors 112 and one or more memory devices 114. The one or more processors 112 can comprise any suitable processing device (e.g., a processor core, a microprocessor, an ASIC, a FPGA, a controller, and/or a microcontroller) and can comprise one processor or a plurality of processors that are operatively connected. The one or more memory devices 114 can comprise one or more non-transitory computer-readable storage mediums, including RAM, ROM, EEPROM, EPROM, solid state drives (SSDs), and/or hard disk drives (HDDs). The one or more memory devices 114 can be configured to store the data 116 and/or the instructions 118 which can be executed by the processor 112 to cause the computing device 102 to perform operations.

In some embodiments, the computing device 102 can perform one or more operations including receiving sensor data, generating an augmented reality environment based on the sensor data and comprising an avatar, detecting inputs to control the avatar within the augmented reality environment, determining facial states of a user, and/or modifying one or more states of the avatar.

In some implementations, the computing device 102 can store and/or implement one or more machine-learning models including the one or more machine-learning models 120. For example, the one or more machine-learning models 120 can comprise various machine-learning models based on various types of machine-learning frameworks including neural networks (e.g., deep neural networks), generative adversarial networks, and/or other types of machine-learning frameworks that can comprise non-linear models and/or linear models. Neural networks can comprise feed-forward neural networks, recurrent neural networks (e.g., long short-term memory recurrent neural networks), convolutional neural networks or other forms of neural networks. Examples of the one or more machine-learning models 120 are described herein.

In some implementations, the one or more machine-learning models 120 can be received from the server computing system 130 over network 104, stored in the one or more memory devices 114, and can be used or otherwise implemented by the one or more processors 112. In some implementations, the computing device 102 can implement multiple parallel instances of a single machine-learning model of the one or more machine-learning models 120 (e.g., to perform parallel facial state detection and/or recognition operations across multiple instances of the machine-learning model 120). More particularly, the one or more machine-learning models 120 can generate and/or modify one or more states of an avatar based in part on various inputs including one or more inputs, one or more facial states of a user which can be based on one or more images of the user, and/or one or more states of a physical environment which can be based on one or more images of the physical environment. Further, the one or more machine-learning models 120 can generate one or more modifications of an appearance of an avatar.

Additionally or alternatively, one or more machine-learning models 140 can be included in or otherwise stored and implemented by the server computing system 130 that can communicate with the computing device 102. For example, the machine-learning models 140 can be implemented by the server computing system 130 as a portion of a web service (e.g., an augmented reality environment service). Thus, one or more machine-learning models 120 can be stored and implemented at the computing device 102 and/or one or more machine-learning models 140 can be stored and implemented by the server computing system 130.

The computing device 102 can also include one or more of the user input components 122 that can be configured to receive one or more user inputs. For example, the one or more user input components 122 can comprise a keyboard, mouse, and/or a touch-sensitive component (e.g., a touch-sensitive display). Other examples of the one or more user input components include a camera, microphone, stylus, or other devices a user can use to provide user input.

The server computing system 130 can comprise one or more processors 132 and one or more memory devices 134. The one or more processors 132 can comprise any suitable processing device (e.g., a processor core, a microprocessor, an ASIC, a FPGA, a controller, and/or a microcontroller) and can comprise one processor or a plurality of processors that are operatively connected. The one or more memory devices 134 can comprise one or more non-transitory computer-readable storage mediums, including RAM, ROM, EEPROM, EPROM, solid state drives (SSDs), and/or hard disk drives (HDDs). The one or more memory devices 134 can be configured to store the data 136 and/or instructions 138 which can be executed by the processor 132 to cause the server computing system 130 to perform operations.

In some embodiments, the server computing system 130 can perform one or more operations including receiving sensor data, generating an augmented reality environment based on the sensor data and comprising an avatar, detecting inputs to control the avatar within the augmented reality environment, determining facial states of a user, and/or modifying one or more states of the avatar.

Furthermore, the server computing system 130 can perform analysis of one or more inputs (e.g., one or more control inputs used to control an avatar in an augmented reality environment) that are provided to the server computing system 130. For example, the server computing system 130 can receive data, via the network 104, including data associated with one or more inputs, one or more states of a user, one or more states of the avatar, one or more states of the augmented reality environment, one or more states of the physical environment. The server computing system 130 can then perform various operations, which can comprise the use of the one or more machine-learning models 140, to detect, determine, modify, and/or generate one or more features of the one or more inputs, one or more states of the avatar, and/or one or more states of the augmented reality environment. In another example, the server computing system 130 can receive data from one or more remote computing systems (not shown) which can comprise data associated with the one or more inputs, one or more states of the avatar, one or more states of the augmented reality environment, and/or one or more states of a remote physical environment. The data received by the server computing system 130 can then be stored (e.g., stored in augmented reality environment repository) for later use by the server computing system 130.

In some implementations, the server computing system 130 can comprise or can be implemented by one or more server computing devices. In instances in which the server computing system 130 includes plural server computing devices, such server computing devices can operate according to various architectures which can comprise sequential computing architectures and/or parallel computing architectures.

As described above, the server computing system 130 can store or otherwise implement one or more machine-learning models 140. For example, the one or more machine-learning models 140 can comprise various machine-learning models. Example machine-learning models include neural networks or other multi-layer non-linear models. Example neural networks include feed forward neural networks, deep neural networks, recurrent neural networks, and convolutional neural networks. Examples of the one or more machine-learning models 140 are discussed with reference to FIGS. 1-10.

The computing device 102 and/or the server computing system 130 can train the one or more machine-learning models 120 and/or 140 via interaction with the training computing system 150 that can be communicatively connected and/or coupled over the network 104. The training computing system 150 can be separate from the server computing system 130 or can be a portion of the server computing system 130.

The training computing system 150 includes one or more processors 152 and one or more memory devices 154. The one or more processors 152 can be any suitable processing device (e.g., a processor core, a microprocessor, an ASIC, a FPGA, a controller, and/or a microcontroller) and can be one processor or a plurality of processors that are operatively connected. The one or more memory devices 154 can comprise one or more non-transitory computer-readable storage mediums, including RAM, ROM, EEPROM, EPROM, solid state drives (SSDs), and/or hard disk drives (HDDs). The one or more memory devices 154 can be configured to store the data 156 and/or the instructions 158 which can be executed by the processor 152 to cause the training computing system 150 to perform operations. In some implementations, the training computing system 150 can comprise or is implemented by one or more server computing devices.

The training computing system 150 can comprise a model trainer 160 that is configured to train the one or more machine-learning models 120 and/or the one or more machine-learning models 140 respectively stored at the computing device 102 and/or the server computing system 130 using various training or machine-learning techniques. The training or machine-learning techniques can, for example, include backwards propagation of errors. In some implementations, performing backwards propagation of errors can comprise performing truncated backpropagation through time. The model trainer 160 can perform a number of generalization techniques (e.g., weight decays and/or dropouts) to improve the generalization capability of the models being configured and/or trained.

In particular, the model trainer 160 can train the one or more machine-learning models 120 and/or the one or more machine-learning models 140 based on a set of training data 162. The training data 162 can comprise, for example, data associated with the one or more inputs, one or more images of a user, one or more states of the avatar, one or more states of the augmented reality environment, and/or one or more images based on one or more states of a physical environment. For example, the training data can comprise actual avatars configured by users, synthetically generated avatars, interactive entities that are implemented in an augmented reality environment, augmented reality environments that have been implemented and/or recorded, chat logs from augmented reality environments, three-dimensional models of virtual objects in an augmented reality environment, and/or user feedback based on user interactions with an augmented reality environment.

In some implementations, if a user has provided consent, the training examples can be provided by the computing device 102. In such implementations, the one or more machine-learning models 120 provided to the computing device 102 can be configured and/or trained by the training computing system 150 on user-specific data received from the computing device 102.

The model trainer 160 can comprise computer logic that is used to perform the operations described herein. The model trainer 160 can be implemented in hardware, firmware, and/or software controlling a general-purpose processor. In some implementations, the model trainer 160 can comprise program files stored on a storage device that are loaded into a memory and executed by one or more processors. In other implementations, the model trainer 160 can comprise one or more sets of computer-executable instructions that can be stored in a tangible computer-readable storage medium including RAM hard disk, optical media, and/or magnetic media.

In some embodiments, the training computing system 150 can perform one or more operations including receiving sensor data, generating an augmented reality environment based on the sensor data and comprising an avatar, detecting inputs to control the avatar within the augmented reality environment, determining facial states of a user, and/or modifying one or more states of the avatar.

The network 104 can comprise any type of communications network, including a local area network (e.g., intranet), wide area network (e.g., Internet), or some combination thereof and can comprise any number of wired or wireless links. In general, communication over the network 104 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, and/or SSL).

FIG. 1 illustrates one example computing system that can be used to implement the present disclosure. Other computing systems can be used as well. For example, in some implementations, the computing device 102 can comprise the model trainer 160 and the training data 162. In such implementations, the one or more machine-learning models 120 can be both trained and used locally at the computing device 102. In such implementations, the computing device 102 can implement the model trainer 160 to personalize the one or more machine-learning models 120 based on user-specific data.

Figure 2:
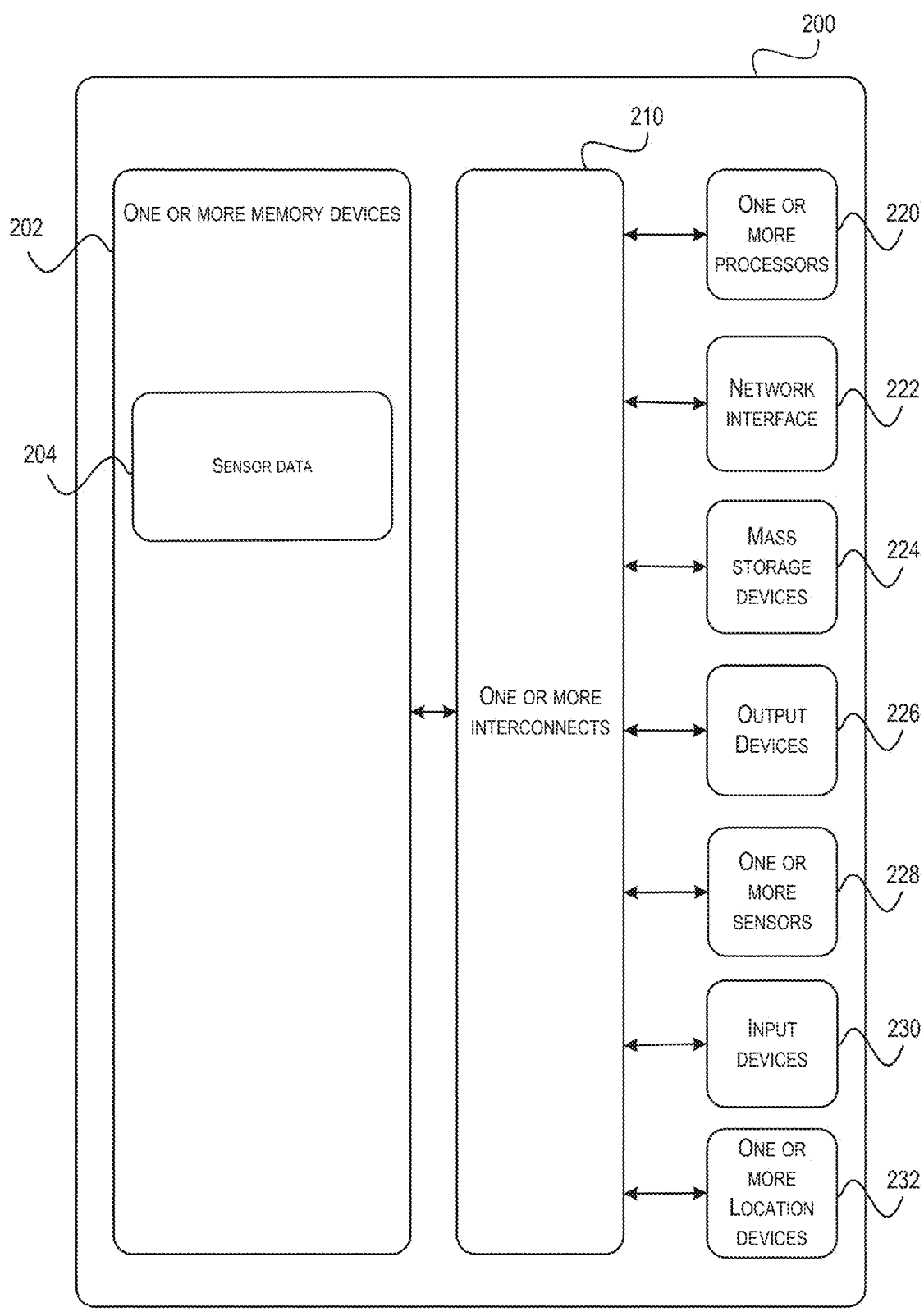
FIG. 2 depicts a diagram of an example computing device according to example embodiments of the present disclosure.

FIG. 2 depicts a block diagram of an example computing device according to example embodiments of the present disclosure. A computing device 200 can comprise one or more attributes and/or capabilities of the computing device 102, the server computing system 130, and/or the training computing system 150. Furthermore, the computing device 200 can be configured to perform one or more operations and/or implement one or more applications that can be performed and/or executed by the computing device 102, the server computing system 130, and/or the training computing system 150. For example, the computing device 200 can implement an application that can access (e.g., via the Internet) an augmented reality environment in which a user can control an avatar via the computing device 200.

As described with respect to FIG. 2, the computing device 200 can comprise one or more memory devices 202, sensor data 204, image data 206, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the sensor data 204 and/or the image data 206). Further, the one or more memory devices 202 can comprise one or more non-transitory computer-readable storage media, including RAM, ROM, EEPROM, EPROM, solid state drives (SSDs), and/or hard disk drives (HDDs). The information and/or data stored by the one or more memory devices 202 can be executed by the one or more processors 220 which can cause the computing device 200 to perform operations including receiving sensor data, generating an augmented reality environment based on the sensor data and comprising an avatar, detecting inputs to control the avatar within the augmented reality environment, determining facial states of a user, and/or modifying one or more states of the avatar.

The sensor data 204 can comprise one or more portions of data (e.g., the data 116, the data 136, and/or the data 156, which are described with respect to FIG. 1) and/or instructions (e.g., the instructions 118, the instructions 138, and/or the instructions 158 which are described with respect to FIG. 1) that are stored in the one or more memory devices 114, the one or more memory devices 134, and/or the one or more memory devices 154, respectively. Furthermore, the sensor data 204 can comprise information associated with one or more images of a user and/or a physical environment (e.g., a physical environment in which a user is present or the physical environment of a user that controls a second additional avatar). In some embodiments, the sensor data 204 can be received from one or more computing systems (e.g., the server computing system 130 described with respect to FIG. 1) which can comprise one or more computing systems that are remote from the computing device 200.

The one or more interconnects 210 can comprise one or more interconnects or buses that can be used to send and/or receive one or more signals (e.g., electronic signals) and/or data (e.g., the sensor data 204 and/or the image data 206) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the location device 232. The one or more interconnects 210 can be arranged or configured in different ways. For example, the one or more interconnects 210 can be configured as parallel or serial connections. Further the one or more interconnects 210 can comprise: one or more internal buses that are used to connect the internal components of the computing device 200; and one or more external buses used to connect the internal components of the computing device 200 to one or more external devices. By way of example, the one or more interconnects 210 can comprise different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can comprise one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the sensor data 204 and/or the image data 206. The one or more processors 220 can comprise single or multiple core devices including a microprocessor, microcontroller, integrated circuit, and/or a logic device.

The network interface 222 can support network communications. The network interface 222 can support communication via networks including a local area network and/or a wide area network (e.g., the Internet). For example, the network interface 222 can allow the computing device 200 to communicate with the computing device 102 via the network 104.

The one or more mass storage devices 224 (e.g., a hard disk drive and/or a solid-state drive) can be used to store data including the sensor data 204 and/or the image data 206. The one or more output devices 226 can comprise one or more display devices (e.g., LCD display, OLED display, Mini-LED display, microLED display, plasma display, and/or CRT display), one or more light sources (e.g., LEDs), one or more loudspeakers, and/or one or more haptic output devices.

The one or more sensors 228 can be configured to detect various states (e.g., states of the computing device 200, a physical environment including a physical environment in which the computing device 200 is present, and/or a user including a user of the computing device 200) and can comprise one or more cameras, one or more light detection and ranging (LiDAR) devices, one or more motion sensors (e.g., one or more accelerometers and/or one or more gyroscopes), one or more sonar devices, and/or one or more radar devices. Further, the one or more sensors 228 can be used to provide input (e.g., an image of a user captured using the one or more cameras) that can be used as part of generating an avatar's facial region. In some embodiments, the one or more sensors 228 can be part of an extended reality device that a user may use to interact with an augmented reality environment.

The one or more input devices 230 can comprise a gamepad, a joystick, one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to capture a user's gestures which can be recognized by the computing device 200 and used to control an avatar within an augmented reality environment).

Although the one or more memory devices 202 and the one or more mass storage devices 224 are depicted separately in FIG. 2, the one or more memory devices 202 and the one or more mass storage devices 224 can be regions within the same memory module. The computing device 200 can comprise one or more additional processors, memory devices, network interfaces, which can be provided separately or on the same chip or board. The one or more memory devices 202 and the one or more mass storage devices 224 can comprise one or more computer-readable media, including, but not limited to, non-transitory computer-readable media, RAM, ROM, hard disk drives (HDDs), solid state drives (SSDs), and/or other memory devices.

The one or more memory devices 202 can store sets of instructions for applications including an operating system that can be associated with various software applications or data. For example, the one or more memory devices 202 can store sets of instructions for one or more applications to generate an augmented reality environment that can comprise an avatar that is controlled via the computing device 200. In some embodiments, the one or more memory devices 202 can be used to operate or execute a general-purpose operating system that operates on mobile computing devices and/or and stationary devices, including extended reality devices, smartphones, laptop computing devices, tablet computing devices, and/or desktop computers.

The software applications that can be operated or executed by the computing device 200 can comprise applications associated with the computing device 102, the server computing system 130, and/or the training computing system 150 that are described with respect to FIG. 1. Further, the software applications that can be operated and/or executed by the computing device 200 can comprise native applications, web services, and/or web-based applications.

The location device 232 can comprise one or more devices or circuitry for determining the location of the computing device 200. For example, the location device 232 can determine an actual (e.g., latitude, longitude, and elevation) and/or relative position of the computing device 200 by using a satellite navigation positioning system (e.g., a GPS system, a Galileo positioning system, the GLObal Navigation satellite system (GLONASS), the BeiDou Satellite Navigation and Positioning system), and/or an inertial navigation system.

Figure 3:
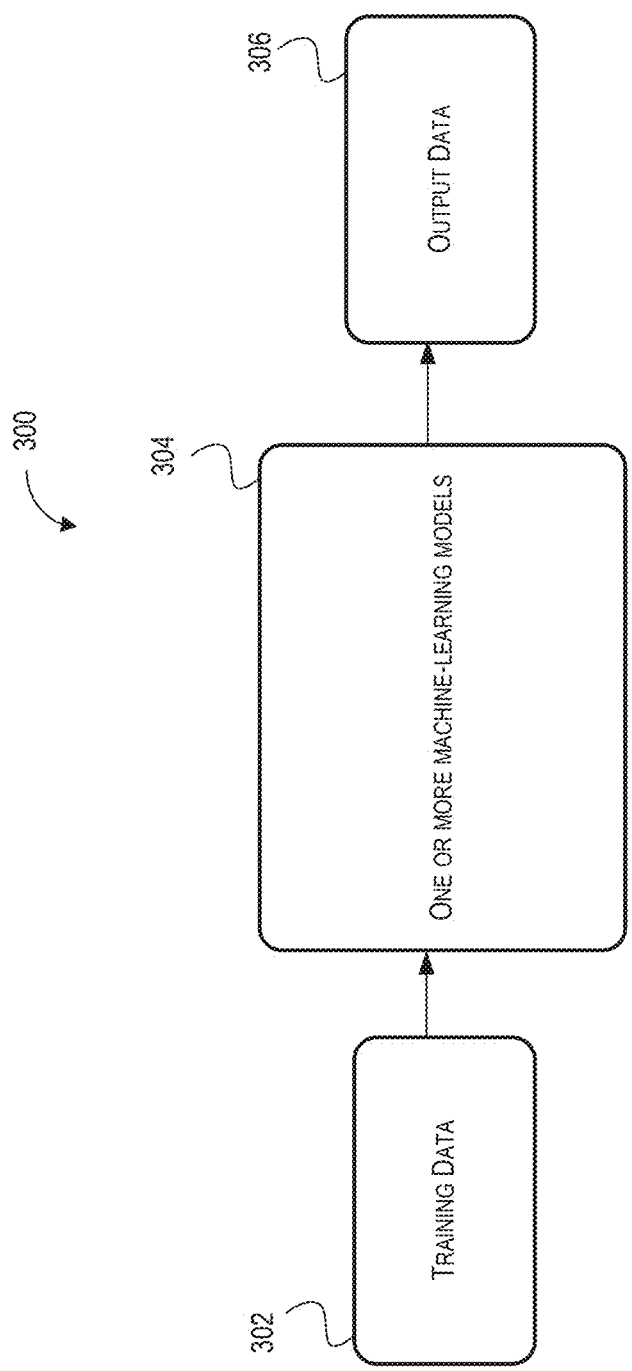
FIG. 3 depicts a diagram of an example machine-learning model according to example embodiments of the present disclosure.

FIG. 3 depicts a diagram of an example machine-learning model according to example embodiments of the present disclosure. The machine-learning model described with respect to FIG. 3 can be generated and/or determined by a computing system or computing device that includes one or more features of the computing device 102, the server computing system 130, and/or the training computing system 150, which are described with respect to FIG. 1; and/or the computing device 200 that is described with respect to FIG. 2. As shown in FIG. 3, the machine-learning system 300 includes training data 302, one or more machine-learning models 304, and output data 306.

The training data 302 can comprise a plurality of training images comprising the plurality of images described herein. For example, the plurality of training images can comprise one or more images of faces (e.g., faces of users) and/or one or more images of various physical environments. The one or more training images can comprise one or more images that are based on processing user images (e.g., actual real-world user images of users) and/or synthetic images that can be generated based on some combination of an algorithm and/or real-world user images.

The one or more machine-learning models 304 can be configured and/or trained to generate output data 306 which can comprise a plurality of outputs based on input comprising the training data 302. The outputs can be associated with detection and/or recognition of facial features. For example, one or more images of a face (e.g., a user's face) can be inputted into a machine-learning model that is configured to determine one or more facial states of the user based on the one or more images. The outputs can be associated with the generation of a facial region of an avatar. For example, one or more facial states of a user can be inputted into a machine-learning model that is configured to generate a facial region (e.g., a three-dimensional facial region) of an avatar based on the one or more facial states. The outputs can be associated with the detection and/or recognition of physical dimensions and/or surfaces in a physical environment. For example, one or more images of a physical environment can be inputted into a machine-learning model that is configured to determine the dimensions of the physical environment based on the one or more images.

The one or more machine-learning models 304 can be configured and/or trained using supervised learning, unsupervised learning, and/or semi-supervised learning. The one or more machine-learning models may use one or more algorithms and/or machine-learning structures including one or more neural networks (e.g., convolutional neural networks), reinforcement learning, one or more decision trees, and/or one or more support vector machines. Additionally, each of the one or more machine-learning models can be configured to operate alone or in combination with one or more other machine-learning models of the one or more machine-learning models 304.

The one or more machine-learning models 304 can comprise a plurality of parameters associated with weights that can be modified as the one or more machine-learning models 304 are configured and/or trained. Configuring and/or training the one or more machine-learning models 304 can comprise modifying the weights associated with the plurality of parameters based on the extent to which each of the plurality of parameters contributes to increasing or decreasing the accuracy of output generated by the one or more machine-learning models 304.

For example, the one or more machine-learning models 304 can comprise a plurality of parameters corresponding to a plurality of visual features of faces. In the process of training the one or more machine-learning models 304, the weighting of the plurality of parameters can be modified based on the extent to which each of the plurality of parameters contributes to accurately determining the facial features of actual users. By way of further example, the one or more machine-learning models 304 can comprise a plurality of parameters corresponding to a plurality of visual features of a physical environment. In the process of training the one or more machine-learning models 304, the weighting of the plurality of parameters can be modified based on the extent to which each of the plurality of parameters contributes to accurately determining the locations of surfaces and/or dimensions of the physical environment (e.g., the output can be compared to ground-truth data that indicates the actual locations and/or dimensions of physical environments depicted in the training images).

Configuring and/or training the one or more machine-learning models 304 can comprise the use of a loss function that can be used to minimize the error (e.g., inaccuracy) between output of the one or more machine-learning models 304 and a set of ground truth values corresponding to accurate output. For example, the training data can comprise a plurality of images of users. The ground-truth data may indicate values associated with the accurate detection and/or recognition of one or more facial states. accurate output. Accurate output by the one or more machine-learning models 304 can comprise accurately detecting and/or recognizing the one or more facial states (e.g., accurately recognizing when a user's face is smiling or winking). The ground-truth data may indicate values associated with the accurate generation of one or more facial regions of an avatar based on input comprising one or more facial states (e.g., facial states of a user). Accurate output by the one or more machine-learning models 304 can comprise accurately generating the one or more facial regions (e.g., accurately generating a smiling avatar when a user is smiling). The ground-truth data may indicate values associated with the accurate detection and/or recognition of dimensions of a physical environment. Accurate output by the one or more machine-learning models 304 can comprise accurately determining the dimensions of physical environments. Inaccurate output by the one or more machine-learning models 304 can comprise not accurately determining the dimensions of physical environments (e.g., determining that the shape and/or size of the physical environments is inaccurate).

As the one or more machine-learning models 304 are configured and/or trained, the weighting of the plurality of parameters of the one or more machine-learning models 304 can be modified until the error associated with the output of the one or more machine-learning models 304 is minimized to a predetermined level (e.g., a level associated with 98% accuracy of determining dimensions of a physical environment). Configuring and/or training the one or more machine-learning models 304 can be performed over a plurality of rounds and/or iterations. Configuring and/or training the one or more machine-learning models 304 can be concluded when a predetermined level of accuracy of the one or more machine-learning models 304 is achieved. Additionally, the one or more machine-learning models 304 can be periodically retrained based on updated training data.

Figure 4:
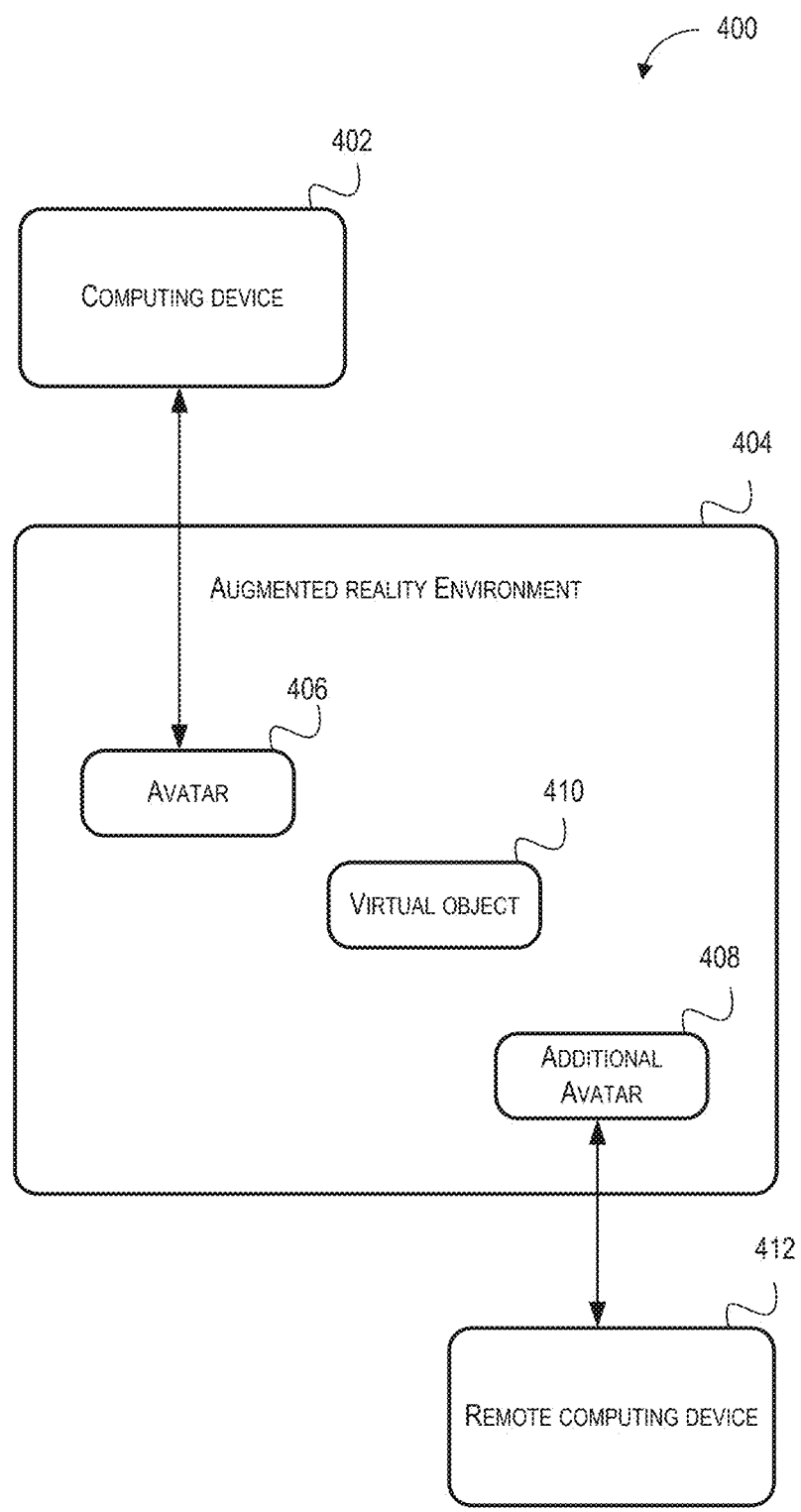
FIG. 4 depicts an example of an augmented reality environment comprising an avatar according to example embodiments of the present disclosure.

FIG. 4 depicts an example of a computing environment comprising an avatar according to example embodiments of the present disclosure. The computing environment described with respect to FIG. 4 can be implemented on a computing system or computing device that includes one or more features of the computing device 102, the server computing system 130, the training computing system 150, which are described with respect to FIG. 1; and/or the computing device 200 that is described with respect to FIG. 2.

As shown in FIG. 4, the computing environment 400 includes computing device 402, an augmented reality environment 404, and avatar 406, an additional avatar 408, a virtual object 410 (e.g., a virtual object that is represented within the augmented reality environment 404), and a remote computing device 412.

The computing device 402 can be configured to detect one or more inputs that can be used to control an avatar within the augmented reality environment 404. The augmented reality environment 404 can be based on a physical environment in which the computing device 402 is physically present. For example, the one or more inputs can be used to control the movement and/or actions of an avatar on a display device of the computing device 402.

The computing device 402 can be configured to detect one or more inputs via a tactile detection component (e.g., a touch screen of a smartphone) that is be configured to detect tactile inputs, a motion detection component (e.g., one or more motion sensors comprising one or more accelerometers and/or one or more gyroscopes) that can be configured to detect motion inputs (e.g., movement of a user's hands and/or body), and/or a microphone that can be configured to capture and/or recognize voice inputs (e.g., recognize voice commands to perform some action such as causing the avatar to move perform some action).

The avatar 406 can comprise a model (e.g., a two-dimensional model or three-dimensional model) that is generated within the augmented reality environment 404. For example, the avatar 406 can be based on a user that controls the computing device 402. In this example, the computing device 402 can be used to control the avatar 406. Further, the remote computing device 412 can be located in a different location (e.g., a different geographic location) from the computing device 402, operated by a different user, and used to control the additional avatar 408. For example, the additional avatar 408 can be controlled from a remote location and based on different inputs than the inputs used to control the avatar 406. In some embodiments, the avatar 406 and/or the additional avatar 408 can be caused to interact with the virtual object 410. For example, the avatar 406 and/or the additional avatar 408 can pick up or move the virtual object 410.

Figure 5:
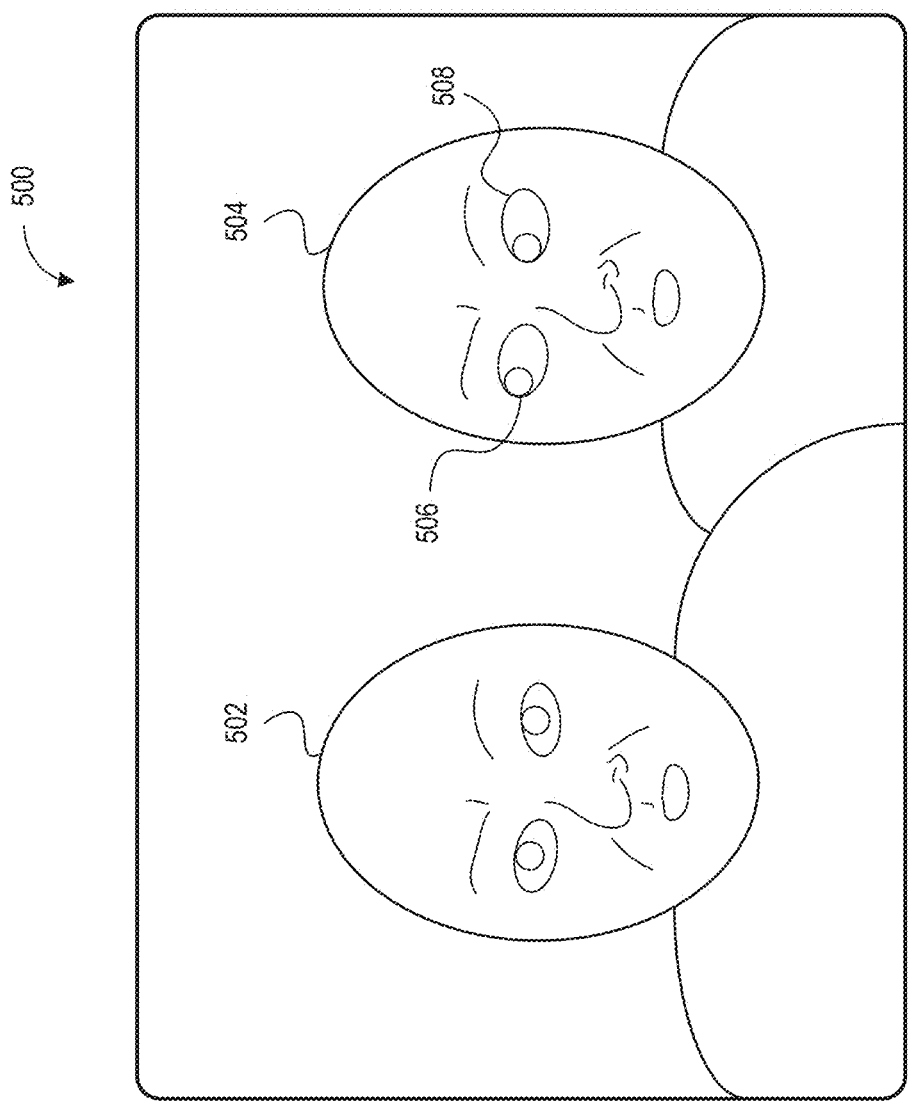
FIG. 5 depicts an example of generating additional avatars in an augmented reality environment according to example embodiments of the present disclosure.

FIG. 5 depicts an example of generating additional avatars in an augmented reality environment according to example embodiments of the present disclosure. The interactive contexts described with respect to FIG. 5 can be generated and/or modified by a computing system or computing device that includes one or more features of the computing device 102, the server computing system 130, and/or the training computing system 150, which are described with respect to FIG. 1; and/or the computing device 200 that is described with respect to FIG. 2.

As shown in FIG. 5, the augmented reality environment 500 includes an image of a user 502 and an avatar 504. The appearance of the avatar 504 can correspond to the appearance of the user 502. For example, the appearance of the avatar 504 can be based on facial features, eyewear, hats, jewelry, and/or clothing of the user. Further, one or more facial states (e.g., facial expressions) of the user 502 can be detected and/or recognized and generated on the avatar 504. For example, the one or more facial states of a user can be used to generate the configuration of the facial region of the avatar.

The augmented reality environment 500 can be based on a plurality of images of a physical environment in which the user 502 is physically present. In some embodiments, the augmented reality environment can be based on images captured by a front-facing camera that captures the user 502. In this example, the user 502 is in the foreground of the augmented reality environment 500 and the avatar 504 is generated beside and slightly behind the user 502. In some embodiments, the avatar 504 can be generated in the foreground (e.g., the avatar 504 can appear to be the closest object that is visible in the augmented reality environment 500). Further, in some embodiments, the avatar 504 can be generated in various locations within the augmented reality environment 500. For example, the avatar 504 can be generated on a different side of the user (e.g., to the left of the user), above the user 502, and/or below the user 502. Additionally, the size of the avatar 504 relative to the augmented reality environment 500 can be modified. For example, the avatar 504 can be modified to appear larger or smaller than the user 502.

In this example, the avatar 504 comprises an eye region 506 and an eye region 508 that correspond to the eyes of the user 502. For example, location of the user 502 relative to the avatar 504 can be determined and the eye region 506 and eye region 508 can be configured to be positioned to gaze in the direction of the user 502. If the user 502 moves, the position of the eye region 506 and the eye region 508 can be modified to track the movement of the user 502. In some embodiments, the eye region 506 and the eye region 508 can be configured to look forwards (e.g., in the direction of the camera that captures the user 502).

Figure 6:
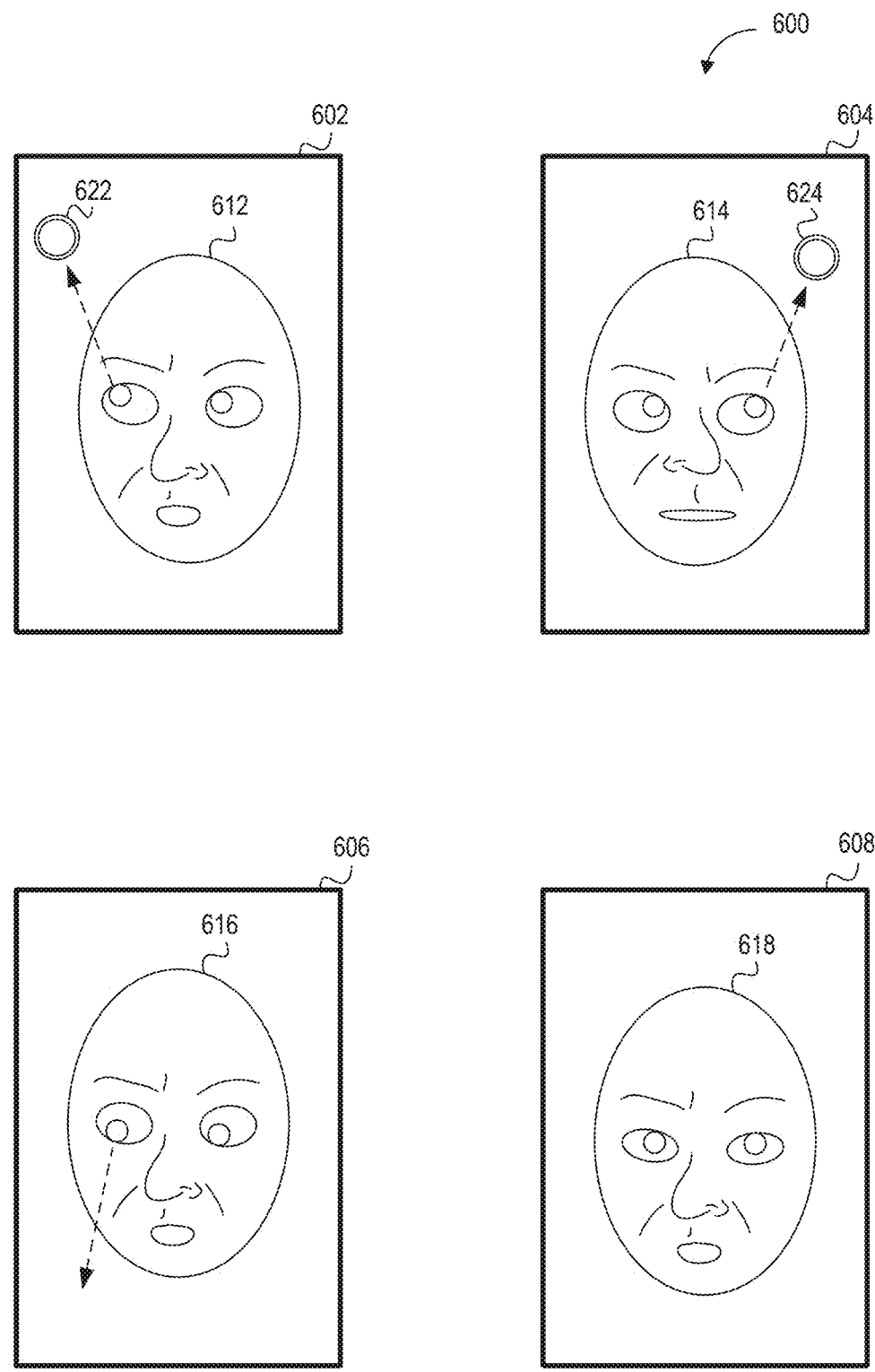
FIG. 6 depicts an example of modifying facial states of an avatar according to example embodiments of the present disclosure.

FIG. 6 depicts an example of modifying facial states of an avatar according to example embodiments of the present disclosure. The output described with respect to FIG. 6 can be generated and/or modified by a computing system or computing device that includes one or more features of the computing device 102, the server computing system 130, and/or the training computing system 150, which are described with respect to FIG. 1; and/or the computing device 200 that is described with respect to FIG. 2.

As shown, FIG. 6 depicts an augmented reality environment 602, augmented reality environment 604, augmented reality environment 606, augmented reality environment 608, an avatar 612, an input 622, an avatar 614, an input 624, an avatar 616, and an avatar 618.

In this example, a plurality of states of avatars 612-618 and a plurality of augmented reality environments 602-608 are shown. Each of the plurality of avatars 602-608 can comprise facial features that can be modified based on one or more inputs (e.g., the inputs 666-628 which can be from a user that an appearance of the avatars 602-608 is based on. For example, in the augmented reality environment 602, an input 622 (e.g., a tactile input by a finger of a user to a touch screen of a smartphone on which the augmented reality environment 602 is generated) can be detected. The location of the input 622 can be determined and the features of the avatar 612 can be modified in response to the input. Further, the avatar 612 comprises a plurality of eye regions that are configured to change configuration based on the detection of an input. In this example, the input 622 is detected and a configuration of the plurality of eye regions of the avatar 612 is modified so that the plurality of eye regions appear to be looking upwards in the direction of the input 622.

Further, in the augmented reality environment 604, an input 624 (e.g., a tactile input by a stylus of a user to a touch screen of a tablet computing device on which the augmented reality environment 602 is generated) can be detected. The location of the input 624 can be determined and the features of the avatar 614 can be modified in response to the input. For example, the avatar 614 can be based on a three-dimensional model that is rotated in the direction of the input 624. Rotating the avatar 614 can result in a change in the appearance of the facial features of the avatar 614 that are visible within the augmented reality environment 604. Additionally, the avatar 614 comprises a plurality of eye regions that are configured to change configuration based on the detection of the input 624. In this example, the input 624 is detected and a configuration of the plurality of eye regions of the avatar 614 is modified so that the plurality of eye regions appear to be looking upwards in the direction of the input 624.

Further, in the augmented reality environment 606, the eye regions of the avatar 616 can be configured to gaze in the direction of a user's face that is detected. For example, the augmented reality environment can be implemented on a computing system (e.g., a smartphone) that comprises a front-facing camera that can be used to capture images of a user's face. The computing system can perform one or more facial detection operations to detect the user's face and can determine the location of the user's face relative to the camera that captured the image of the user's face. The features of the avatar 616 can be modified in response to the input. For example, the eye regions of the avatar 616 can be configured to change configuration based on the detection of the user's face. In this example, the computing device can be held above the height of a user's head and a configuration of the plurality of eye regions of the avatar 616 can be modified so that the plurality of eye regions appear to be looking downwards in the direction of the user that is holding the computing system on which the augmented reality environment 606 is implemented.

Further, in the augmented reality environment 608, the eye regions of the avatar 618 can be configured to gaze in the direction of a user's face that is detected. For example, the augmented reality environment can be implemented on a computing system (e.g., a smartphone) that comprises a front-facing camera that can be used to capture images of a user's face. The computing system can perform one or more facial detection operations to detect the user's face and can determine the location of the user's face relative to the camera that captured the image of the user's face. The features of the avatar 618 can be modified in response to the input. For example, the eye regions of the avatar 618 can be configured to change configuration based on the detection of the user's face. In this example, a configuration of the plurality of eye regions of the avatar 618 can be modified so that the plurality of eye regions appear to be looking straight forward in the direction of the user that is holding the computing system on which the augmented reality environment 608 is implemented.

Figure 7:
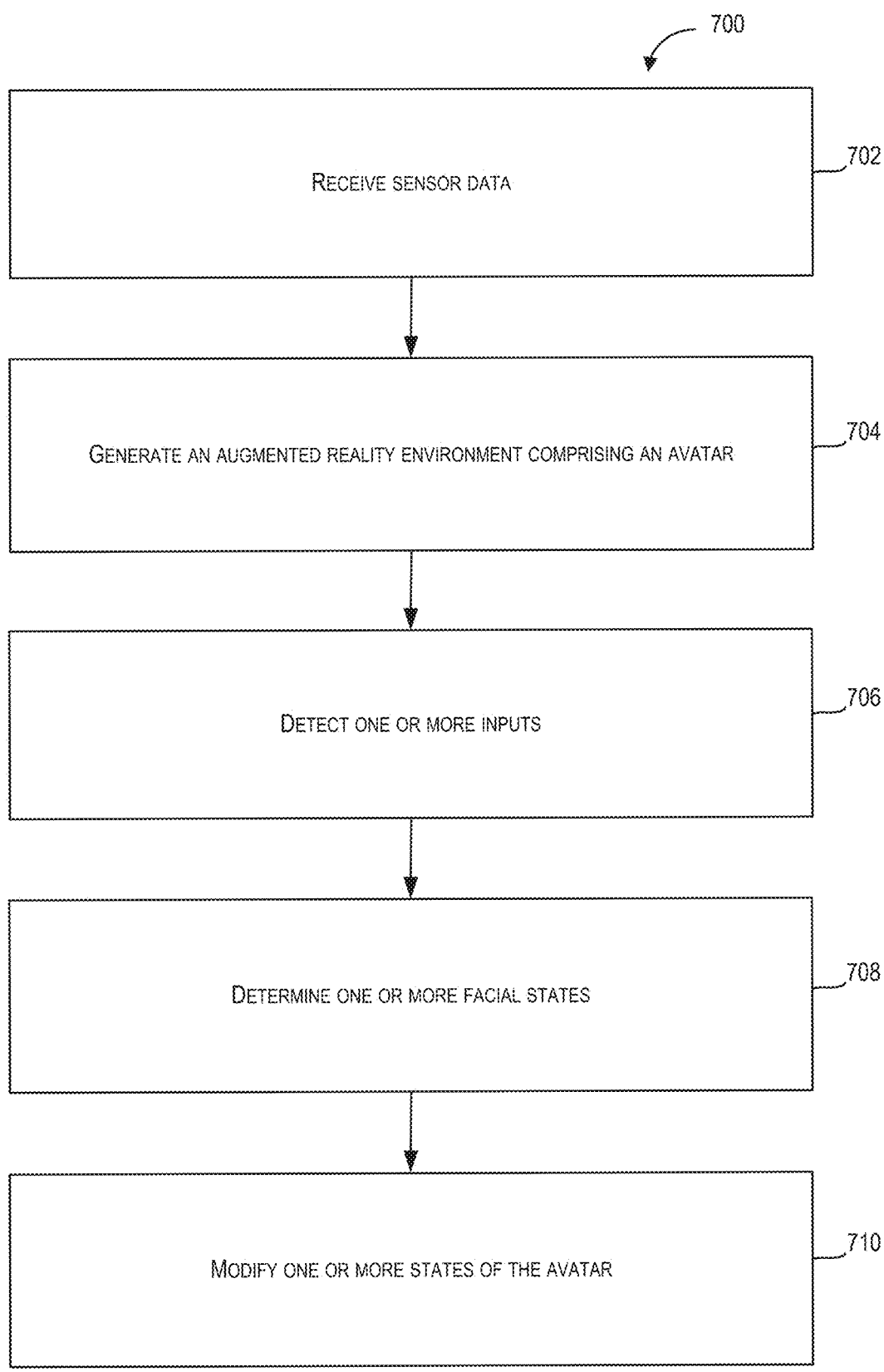
FIG. 7 depicts a flow diagram of controlling an avatar according to example embodiments of the present disclosure.

FIG. 7 depicts a flow diagram of controlling an avatar according to example embodiments of the present disclosure. One or more portions of the method 700 can be executed or implemented on one or more computing devices or computing systems including, for example, the computing device 102, the server computing system 130, and/or the training computing system 150; and/or the computing device 200 that is described with respect to FIG. 2. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can comprise receiving sensor data comprising a plurality of images of a physical environment and/or one or more images of a user. For example, the computing device 102 (e.g., a smartphone) can comprise cameras that are configured to capture the plurality of images of the physical environment (e.g., a room in which a user is present) and/or the one or more images of the user.

At 704, the method 700 can comprise generating, based on the sensor data, an augmented reality environment comprising an avatar. The augmented reality environment can be based on the plurality of images of the physical environment. Further, the avatar can comprise a three-dimensional model comprising a facial region based on the one or more images of the user. For example, the computing device 102 can generate an augmented reality environment based on the plurality of images of the physical environment. Further, the computing device can overlay a model (e.g., a two-dimensional model or three-dimensional model) of the avatar on the augmented reality environment. Further, the computing device 102 can use the one or more images to generate the facial region of the avatar (e.g., a facial region of the avatar that resembles the face of the user in the one or more images of the user).

At 706, the method 700 can comprise detecting one or more inputs to control the avatar within the augmented reality environment. For example, the computing device 102 can detect the one or more inputs entered via one or more input devices (e.g., a tactile input detected based on a user touching a touch screen of the computing device 102). In some embodiments, the computing device 102 can be configured to detect the one or more inputs via a communication network (e.g., a wireless and/or wired network which can comprise a LAN, WAN, or the Internet) through which one or more inputs are transmitted.

At 708, the method 700 can comprise determining, based on the one or more images of the user, one or more facial states of the user. For example, the computing device 102 can implement a machine-learning model and determine the one or more facial states of the user based on inputting the one or more images of the user into the machine-learning model. The machine-learning model can be configured to detect and/or recognize the one or more facial states of the user.

At 710, the method 700 can comprise modifying, based on the one or more inputs and the one or more facial states, one or more states of the avatar. The one or more states of the avatar can comprise a position of the avatar within the augmented reality environment and/or a configuration of the facial region which can be based on the one or more facial states. For example, the computing device 102 can detect one or more inputs to cause the avatar to walk forward and modify the position of the avatar within the augmented reality environment by causing the avatar to walk forward in the augmented reality environment.

Figure 8:
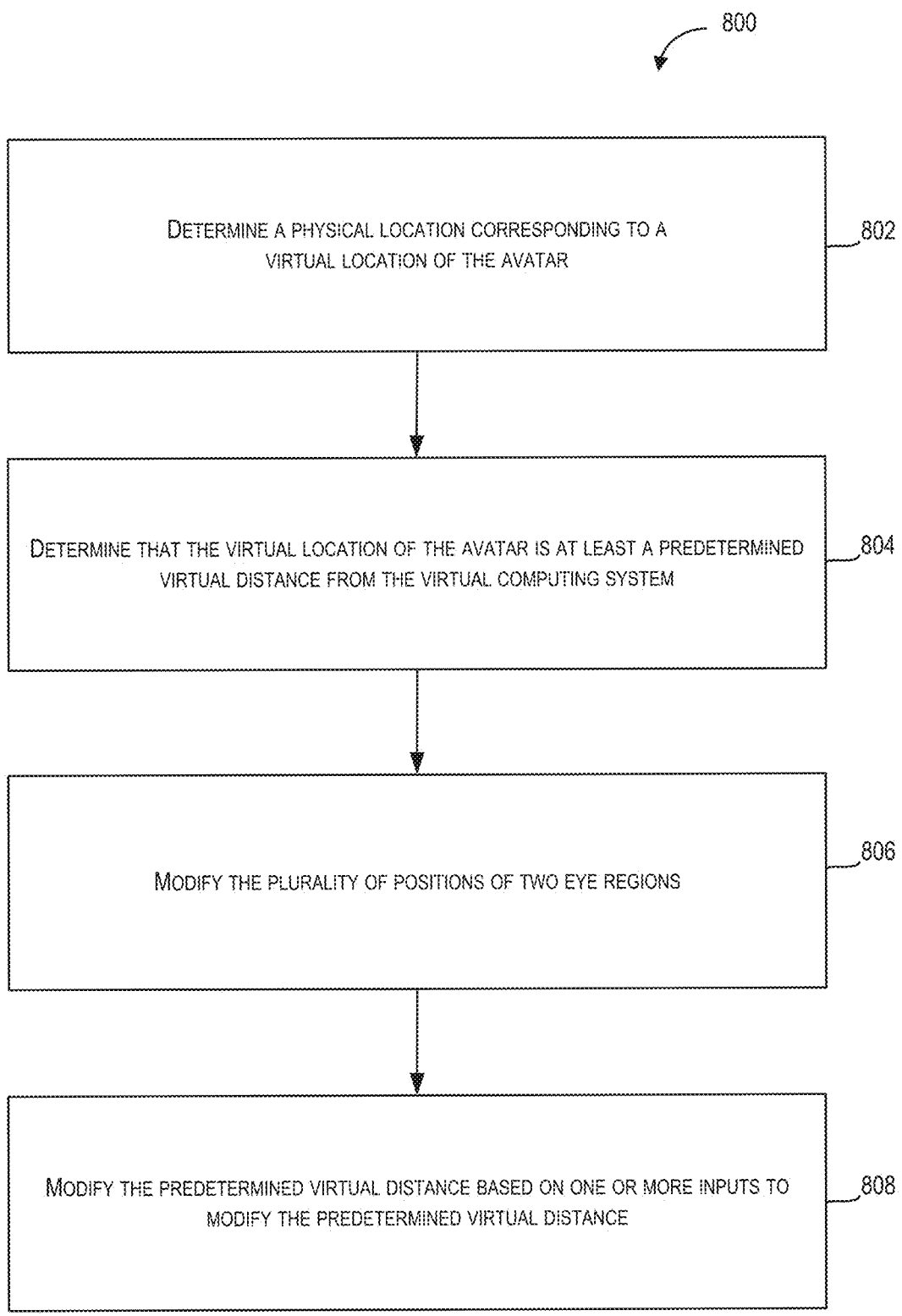
FIG. 8 depicts a flow diagram of an example method of determining an avatar's location in an augmented reality environment according to example embodiments of the present disclosure.

FIG. 8 depicts a flow diagram of an example method of determining an avatar's location in an augmented reality environment according to example embodiments of the present disclosure. One or more portions of the method 1000 can be executed or implemented on one or more computing devices or computing systems including, for example, the computing device 102, the server computing system 130, and/or the training computing system 150; and/or the computing device 200 that is described with respect to FIG. 2. Further, one or more portions of the method 800 can be executed and/or implemented as an algorithm on the hardware devices or systems disclosed herein. In some embodiments, one or more portions of the method 800 can be performed as part of the method 700 that is described with respect to FIG. 7. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can comprise determining a virtual location of the avatar within the augmented reality environment. For example, the computing device 102 can use the sensor data to determine the physical location of the computing device 102, and the physical location of the computing device 102 can correspond to a virtual location of a virtual computing device within the augmented reality environment. The virtual location of the virtual computing device can be used to determine the location of the avatar within the augmented reality environment.

At 804, the method 800 can comprise determining, based on the sensor data, that the virtual location of the avatar is at least a predetermined virtual distance from the virtual computing system. For example, the computing device 102 can generate the avatar a predetermined virtual distance from the virtual computing system in the augmented reality environment.

At 806, the method 800 can comprise based on detecting the one or more tactile inputs, modifying the plurality of positions of the two eye regions to be directed towards the virtual computing system. For example, the computing device 102 can detect a user touching a touch screen of the computing device 102. The computing device 102 can then modify the positions of the two eye regions to appear to be oriented in the direction of the portion of the touch screen in which the user touch was detected.

At 808, the method 800 can comprise modifying the predetermined virtual distance based on one or more inputs to modify the predetermined virtual distance. For example, the computing device 102 can be configured to receive an input to increase or decrease the predetermined virtual distance.

Figure 9:
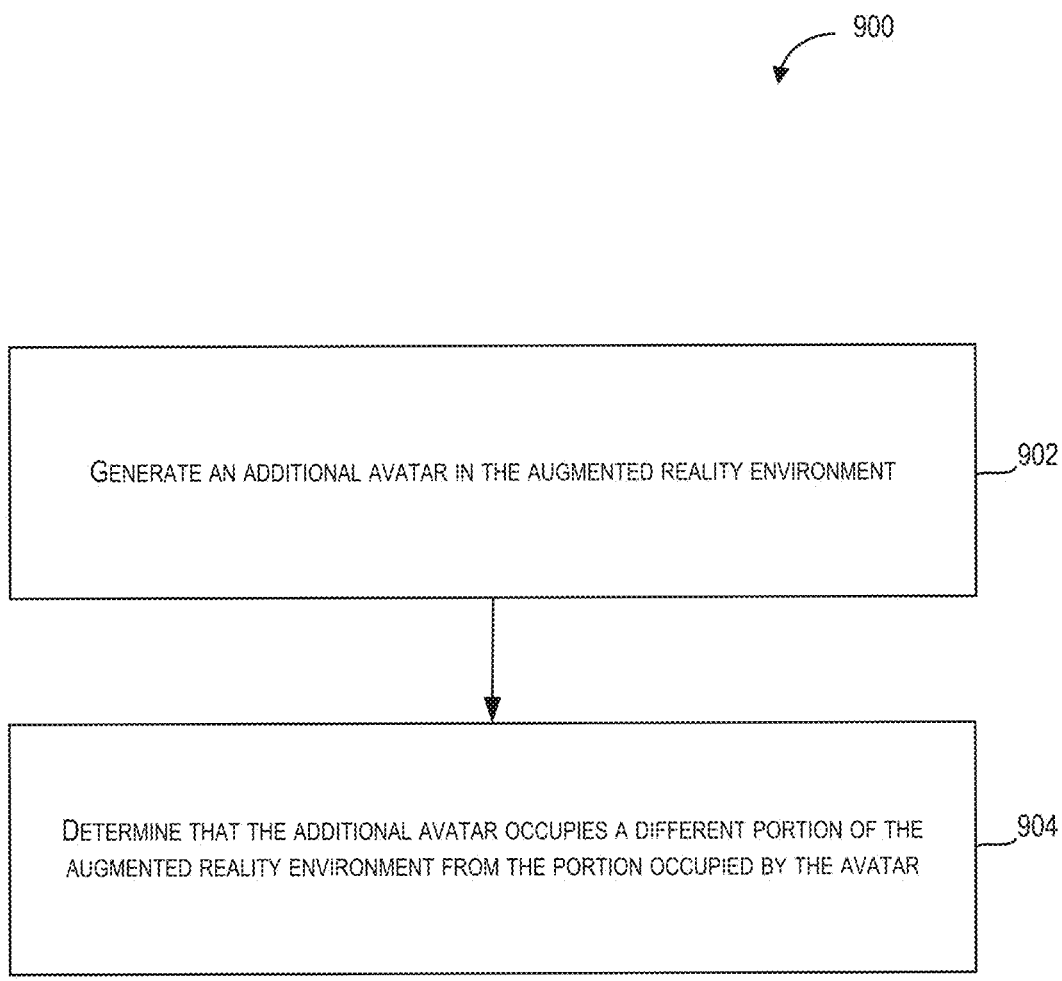
FIG. 9 depicts a flow diagram of an example method of generating an additional avatar in an augmented reality environment according to example embodiments of the present disclosure.

FIG. 9 depicts a flow diagram of an example method of generating an additional avatar in an augmented reality environment according to example embodiments of the present disclosure. One or more portions of the method 900 can be executed or implemented on one or more computing devices or computing systems including, for example, the computing device 102, the server computing system 130, and/or the training computing system 150; and/or the computing device 200 that is described with respect to FIG. 2. Further, one or more portions of the method 900 can be executed and/or implemented as an algorithm on the hardware devices or systems disclosed herein. In some embodiments, one or more portions of the method 900 can be performed as part of the method 700 that is described with respect to FIG. 7. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can comprise generating an additional avatar in the augmented reality environment, wherein the additional avatar is different from the avatar. For example, the computing device 102 can generate an additional avatar with a position in the augmented reality environment that is based on the position of the avatar (e.g., the additional avatar can stand next to the avatar).

At 904, the method 900 can comprise determining that a portion of the augmented reality environment occupied by the avatar is different from the portion of the augmented reality environment occupied by the additional avatar. For example, the computing device 102 can determine that the avatar and the additional avatar do not occupy the same portion of the augmented reality environment.

Figure 10:
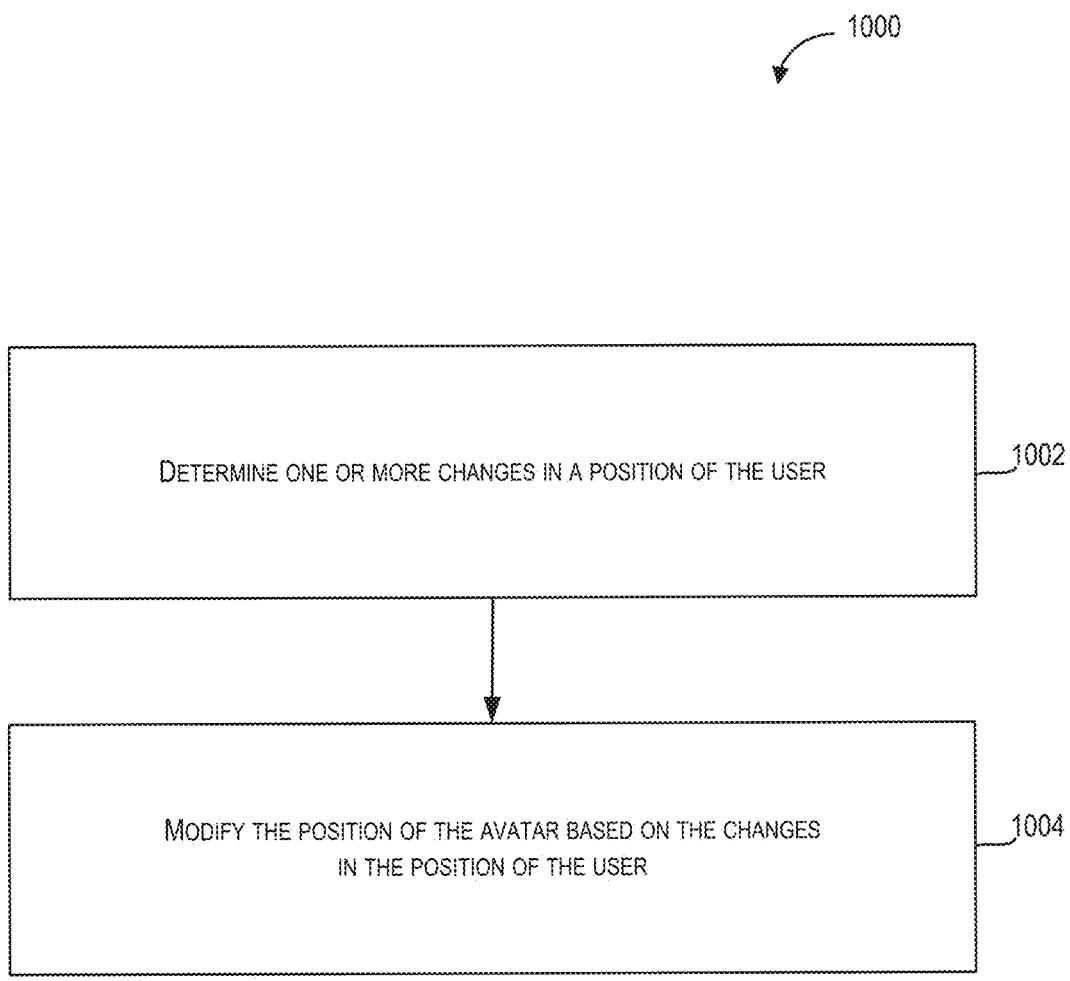
FIG. 10 depicts a flow diagram of an example method of modifying positions of an avatar in an augmented reality environment according to example embodiments of the present disclosure.

FIG. 10 depicts a flow diagram of an example method of modifying positions of an avatar in an augmented reality environment according to example embodiments of the present disclosure. One or more portions of the method 1000 can be executed or implemented on one or more computing devices or computing systems including, for example, the computing device 102, the server computing system 130, and/or the training computing system 150; and/or the computing device 200 that is described with respect to FIG. 2. Further, one or more portions of the method 1000 can be executed and/or implemented as an algorithm on the hardware devices or systems disclosed herein. In some embodiments, one or more portions of the method 1000 can be performed as part of the method 700 that is described with respect to FIG. 7. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can comprise determining, based on the one or more images of the user, one or more changes in a position of the user. For example, the computing device 102 can detect one or more changes in the position of the user based on one or more cameras of the computing device 102. Further, the computing device 102 can process the one or more images of the user to determine the one or more changes in the position of the user.

At 1004, the method 1000 can comprise modifying the position of the avatar based on the one or more changes in the position of the user. For example, the computing device 102 can modify the position of the avatar within the augmented reality environment.

The technology discussed herein makes reference to computing systems that can include servers, clients, software applications, databases, and/or other computer-based systems. Further, the technology discussed herein also makes reference to actions performed by such systems and/or information sent to and from such computing systems. The inherent flexibility of computer-based systems allows for a great variety of possible configurations, combinations, and divisions of tasks and functionality between and among components. For instance, processes discussed herein can be implemented using a single device or component or multiple devices or components working in combination. Applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to achieve another additional embodiment. Thus, it is intended that the present disclosure covers such alterations, variations, and/or equivalents.

What is claimed is:

1. A computer-implemented method of controlling avatars, the method comprising:
   receiving, by a computing system comprising one or more processors, sensor data comprising a plurality of images of a physical environment and one or more images of a user;
   generating, by the computing system, based on the sensor data, an augmented reality environment comprising an avatar, wherein the augmented reality environment is based on the plurality of images of the physical environment, wherein virtual distances within the augmented reality environment correspond to physical distances within the physical environment, wherein the augmented reality environment comprises a virtual computing system located at a virtual location within the augmented reality environment that corresponds to a physical location of the computing system within the physical environment, and wherein the avatar comprises a three-dimensional model comprising a facial region based on the one or more images of the user;
   determining, by the computing system, the virtual location of the avatar within the augmented reality environment;
   determining, by the computing system, based on the sensor data, that the virtual location of the avatar is at least a predetermined virtual distance from the virtual computing system;
   detecting, by the computing system, one or more inputs to control the avatar within the augmented reality environment;
   determining, by the computing system, based on the one or more images of the user, one or more facial states of the user; and
   modifying, by the computing system, based on the one or more inputs and the one or more facial states, one or more states of the avatar, wherein the one or more states of the avatar comprise a position of the avatar within the augmented reality environment and a configuration of the facial region based on the one or more facial states.

2. The computer-implemented method of claim 1 further comprising:
   modifying, by the computing system, the predetermined virtual distance based on one or more inputs to modify the predetermined virtual distance.

3. The computer-implemented method of claim 1 wherein the avatar comprises a plurality of segments, and wherein the avatar is configured to perform a plurality of movements to move to at least the predetermined virtual distance from the virtual computing system based on the virtual computing system being within the predetermined virtual distance from the virtual location of the avatar.

4. The computer-implemented method of claim 3, wherein the plurality of movements comprises the plurality of segments changing position in a manner corresponding to bipedal locomotion.

5. The computer-implemented method of claim 1 wherein the facial region comprises two eye regions configured to be in a plurality of positions, and wherein the one or more inputs comprise one or more tactile inputs and further comprising:
   based on detecting the one or more tactile inputs, modifying, by the computing system, the plurality of positions of the two eye regions to be directed towards the virtual computing system.

6. The computer-implemented method of claim 1, wherein the plurality of images of the physical environment comprise the one or more images of the user.

7. The computer-implemented method of claim 6, wherein the avatar is substantially adjacent to the user within the augmented reality environment.

8. The computer-implemented method of claim 1, wherein the one or more images of the user are based on detection of the user by a front-facing camera of the computing system.

9. The computer-implemented method of claim 1, further comprising:
    generating, by the computing system, an additional avatar in the augmented reality environment, wherein the additional avatar is different from the avatar; and
    determining, by the computing system, that the additional avatar occupies a different portion of the augmented reality environment from the portion of the augmented reality environment occupied by the avatar.

10. The computer-implemented method of claim 9, wherein the additional avatar is controlled by a second user that is not in the physical environment.

11. The computer-implemented method of claim 9, wherein the avatar and the additional avatar are configured to interact with one or more virtual objects within the augmented reality environment.

12. The computer-implemented method of claim 1, further comprising:
    determining, by the computing system, based on the one or more images of the user, one or more changes in a position of the user; and
    modifying, by the computing system, the position of the avatar based on the one or more changes in the position of the user.

13. One or more tangible, non-transitory computer-readable media storing computer-readable instructions that when executed by one or more processors cause the one or more processors to perform operations, the operations comprising:
    receiving sensor data comprising a plurality of images of a physical environment and one or more images of a user;
    generating, based on the sensor data, an augmented reality environment comprising an avatar, wherein the augmented reality environment is based on the plurality of images of the physical environment, wherein virtual distances within the augmented reality environment correspond to physical distances within the physical environment, wherein the augmented reality environment comprises a virtual computing system located at a virtual location within the augmented reality environment that corresponds to a physical location of the computing system within the physical environment, and wherein the avatar comprises a three-dimensional model comprising a facial region based on the one or more images of the user;
    determining the virtual location of the avatar within the augmented reality environment;
    determining, based on the sensor data, that the virtual location of the avatar is at least a predetermined virtual distance from the virtual computing system;
    detecting one or more inputs to control the avatar within the augmented reality environment;
    determining, based on the one or more images of the user, one or more facial states of the user; and
    modifying, based on the one or more inputs and the one or more facial states, one or more states of the avatar, wherein the one or more states of the avatar comprise a position of the avatar within the augmented reality environment and a configuration of the facial region based on the one or more facial states.

14. A computing system comprising:
    one or more processors;
    one or more non-transitory computer-readable media storing instructions that when executed by the one or more processors cause the one or more processors to perform operations comprising:
        receiving sensor data comprising a plurality of images of a physical environment and one or more images of a user;
        generating, based on the sensor data, an augmented reality environment comprising an avatar, wherein the augmented reality environment is based on the plurality of images of the physical environment, wherein virtual distances within the augmented reality environment correspond to physical distances within the physical environment, wherein the augmented reality environment comprises a virtual computing system located at a virtual location within the augmented reality environment that corresponds to a physical location of the computing system within the physical environment, and wherein the avatar comprises a three-dimensional model comprising a facial region based on the one or more images of the user;
        determining the virtual location of the avatar within the augmented reality environment;
        determining, based on the sensor data, that the virtual location of the avatar is at least a predetermined virtual distance from the virtual computing system;
        detecting one or more inputs to control the avatar within the augmented reality environment;
        determining, based on the one or more images of the user, one or more facial states of the user; and
        modifying, based on the one or more inputs and the one or more facial states, one or more states of the avatar, wherein the one or more states of the avatar comprise a position of the avatar within the augmented reality environment and a configuration of the facial region based on the one or more facial states.

15. The computing system of claim 14, wherein the operations further comprise:
    modifying the predetermined virtual distance based on one or more inputs to modify the predetermined virtual distance.

16. The computing system of claim 14, wherein the avatar comprises a plurality of segments, and wherein the avatar is configured to perform a plurality of movements to move to at least the predetermined virtual distance from the virtual computing system based on the virtual computing system being within the predetermined virtual distance from the virtual location of the avatar.

17. The computing system of claim 16, wherein the plurality of movements comprises the plurality of segments changing position in a manner corresponding to bipedal locomotion.

18. The one or more tangible non-transitory computer-readable media of claim 13, wherein the operations further comprise:
    modifying the predetermined virtual distance based on one or more inputs to modify the predetermined virtual distance.

19. The one or more tangible non-transitory computer-readable media of claim 13, wherein the avatar comprises a plurality of segments, and wherein the avatar is configured to perform a plurality of movements to move to at least the predetermined virtual distance from the virtual computing system based on the virtual computing system being within the predetermined virtual distance from the virtual location of the avatar.

20. The one or more tangible non-transitory computer-readable media of claim 19, wherein the plurality of movements comprises the plurality of segments changing position in a manner corresponding to bipedal locomotion.

\* \* \* \* \*